United States Patent
Fujita et al.

(10) Patent No.: US 7,430,199 B2
(45) Date of Patent: Sep. 30, 2008

(54) PULSE-MODULATED WIRELESS COMMUNICATION APPARATUS

(75) Inventors: Suguru Fujita, Ota-ku (JP); Kazuaki Takahashi, Macida (JP); Masahiro Mimura, Suginami-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 805 days.

(21) Appl. No.: 10/850,339

(22) Filed: May 20, 2004

(65) Prior Publication Data

US 2004/0233889 A1    Nov. 25, 2004

(30) Foreign Application Priority Data

May 21, 2003   (JP)   ............................. 2003-143044
May 7, 2004    (JP)   ............................. 2004-138227

(51) Int. Cl.
   *H04J 3/06*   (2006.01)
(52) U.S. Cl. ..................................................... 370/350
(58) Field of Classification Search ....................... None
   See application file for complete search history.

(56) References Cited

U.S. PATENT DOCUMENTS

| | | | |
|---|---|---|---|
| 5,793,794 A | 8/1998 | Kato et al. | |
| 5,978,412 A | 11/1999 | Takai | |
| 6,505,032 B1 * | 1/2003 | McCorkle et al. | .......... 455/41.2 |
| 7,068,715 B2 * | 6/2006 | Hoctor et al. | ............... 375/239 |
| 7,079,604 B1 * | 7/2006 | Miller et al. | ................ 375/343 |

FOREIGN PATENT DOCUMENTS

| | | |
|---|---|---|
| JP | 7-99487 | 4/1995 |
| JP | 8-167864 | 6/1996 |
| JP | 08-167864 | 6/1996 |
| JP | 10-56405 | 2/1998 |
| WO | WO 01/93442 A | 12/2001 |

OTHER PUBLICATIONS

Roy et al, Design Challenges for Very High Data Rate UWB Systems, IEEE, pp. 717-721, 2002.*
Hoctor et al, Delay-Hopped Transmitted-Reference RF Communications, IEEE, pp. 265-269, 2002.*
Yang et al, Ultra-Wideband Communications, An Idea Whose Time Has Come, IEEE, pp. 26-54, Nov. 2004.*

* cited by examiner

Primary Examiner—Frank Duong
(74) Attorney, Agent, or Firm—RatnerPrestia

(57) ABSTRACT

Using an inputted transmission information signal, a synchronizing signal and a data signal are generated. The synchronizing signal is set at and outputted to a first frequency channel comprising at least one frequency channel. The data signal is set at a second frequency channel comprising at least one frequency channel. The first frequency channel and the second frequency channel use frequency channels different from each other. This provides the signal synchronizing information at a frequency channel separate from that of the data. A sufficient time can be assigned for synchronization, making it possible to swiftly demodulate the signal during data reception.

43 Claims, 34 Drawing Sheets

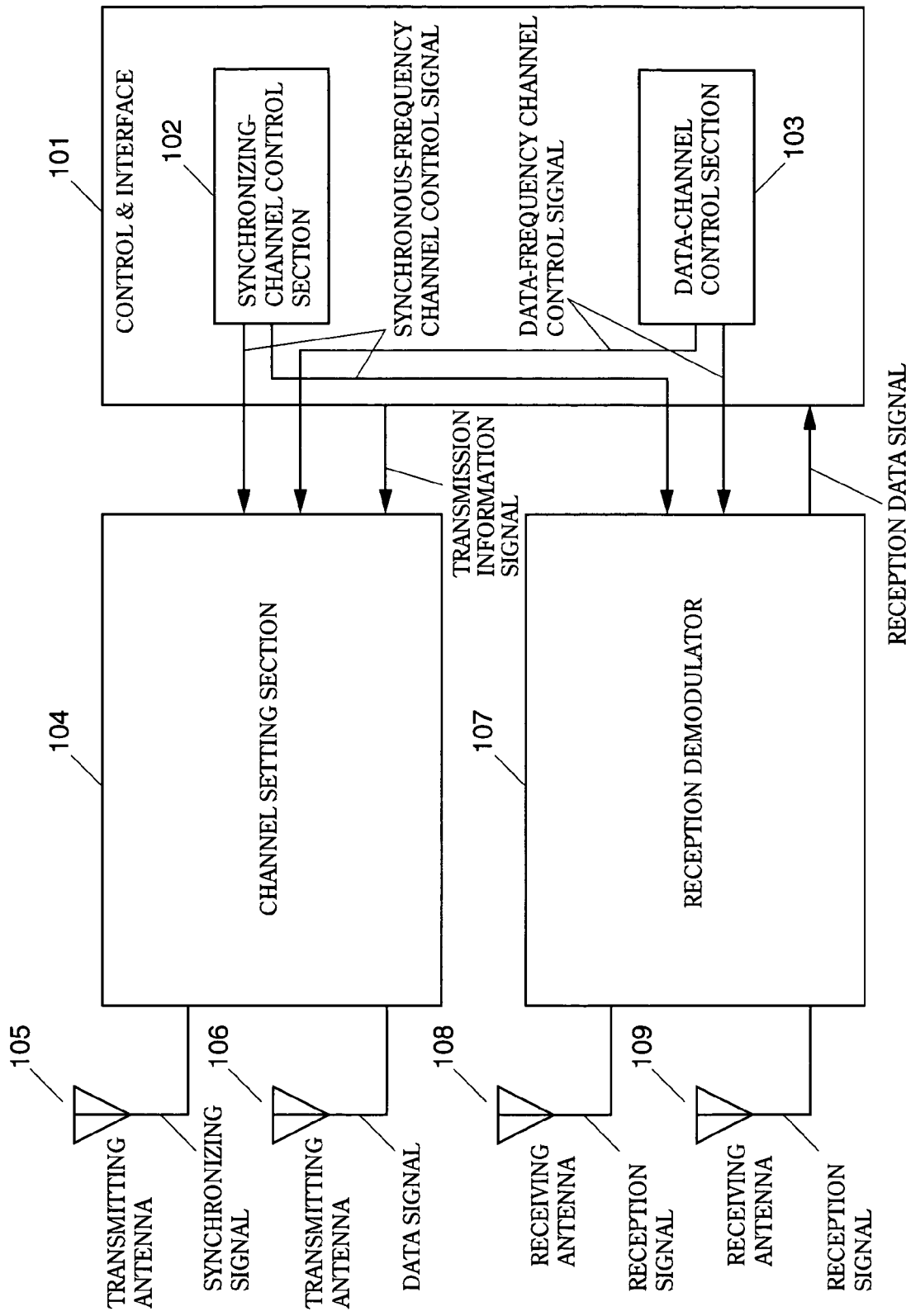
f i g. 2

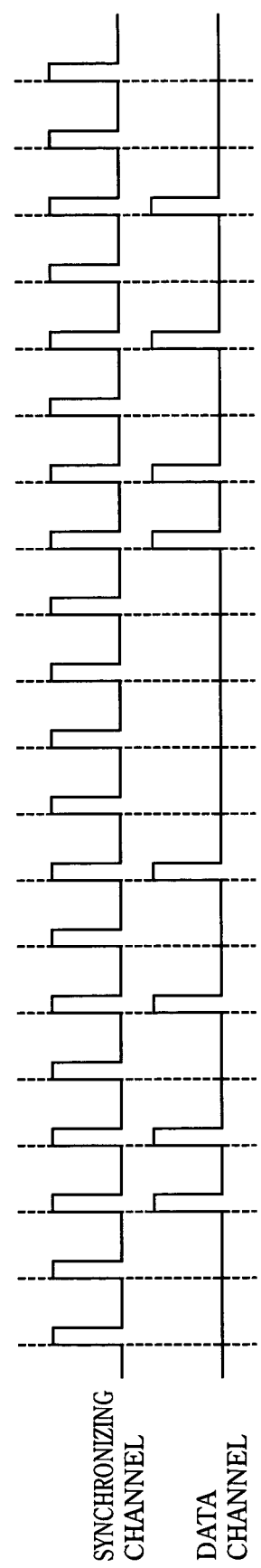

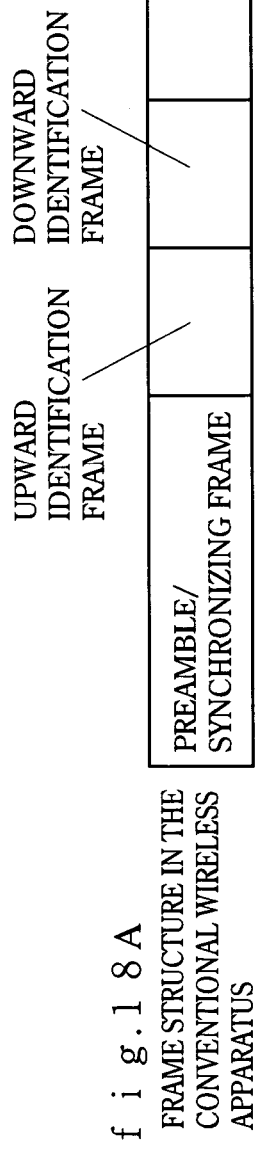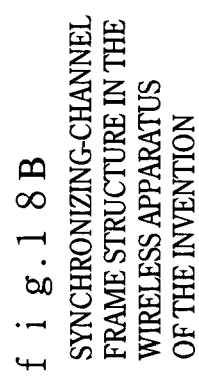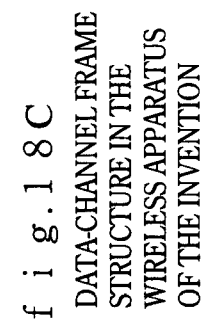
f i g . 1 8 A
FRAME STRUCTURE IN THE CONVENTIONAL WIRELESS APPARATUS
f i g . 1 8 B
SYNCHRONIZING-CHANNEL FRAME STRUCTURE IN THE WIRELESS APPARATUS OF THE INVENTION
f i g . 1 8 C
DATA-CHANNEL FRAME STRUCTURE IN THE WIRELESS APPARATUS OF THE INVENTION

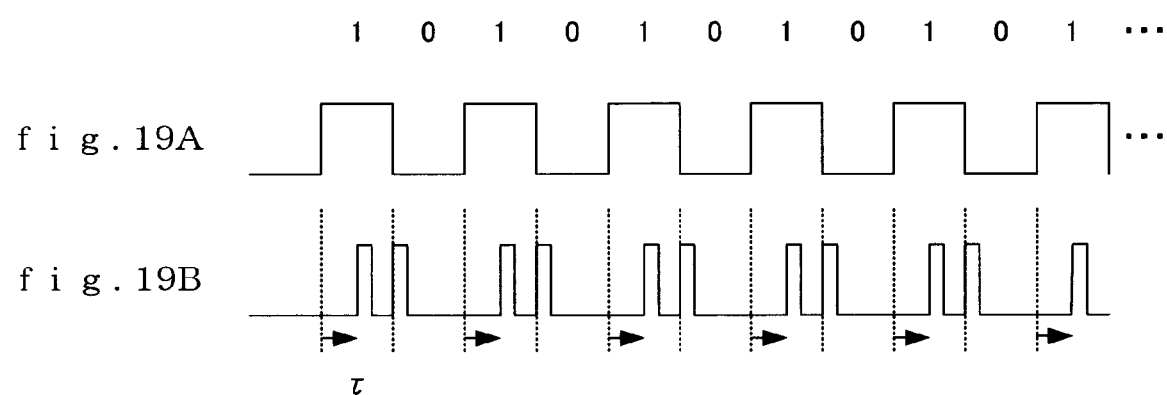

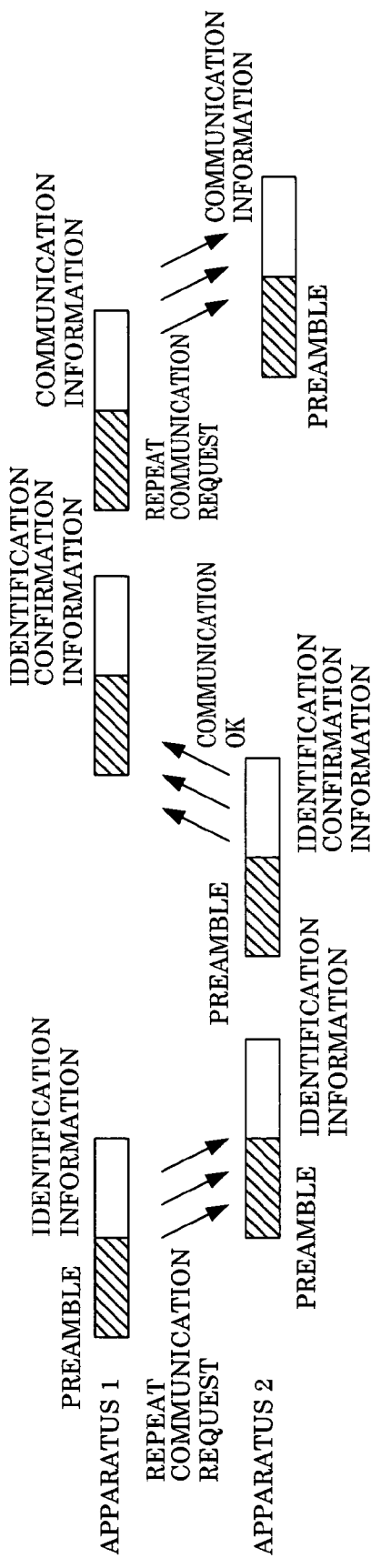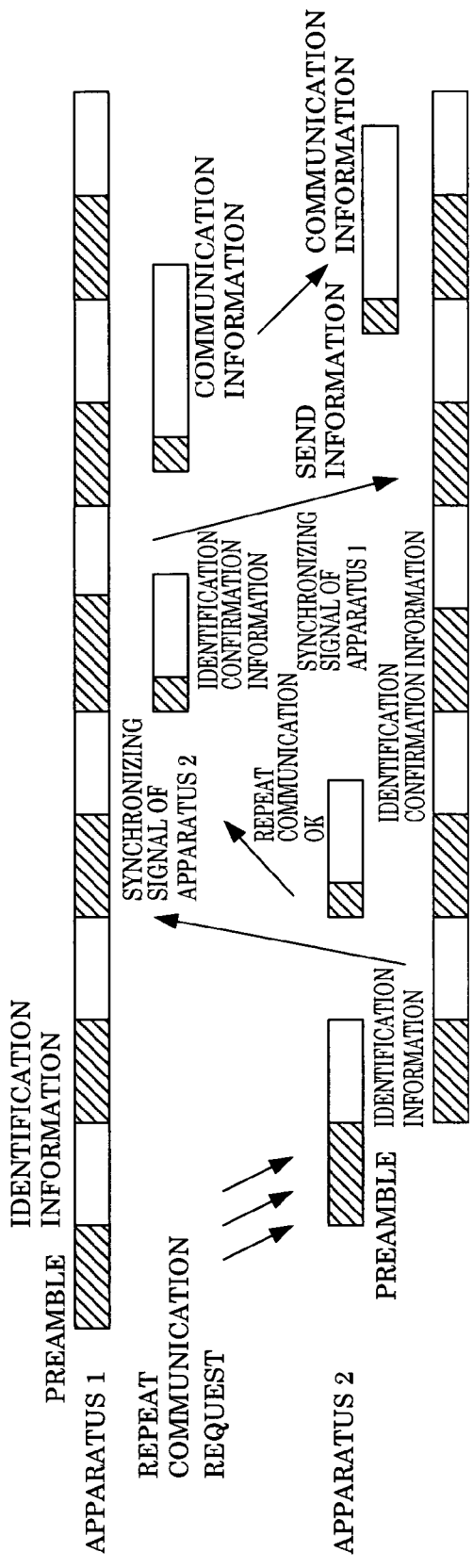

f i g . 2 3
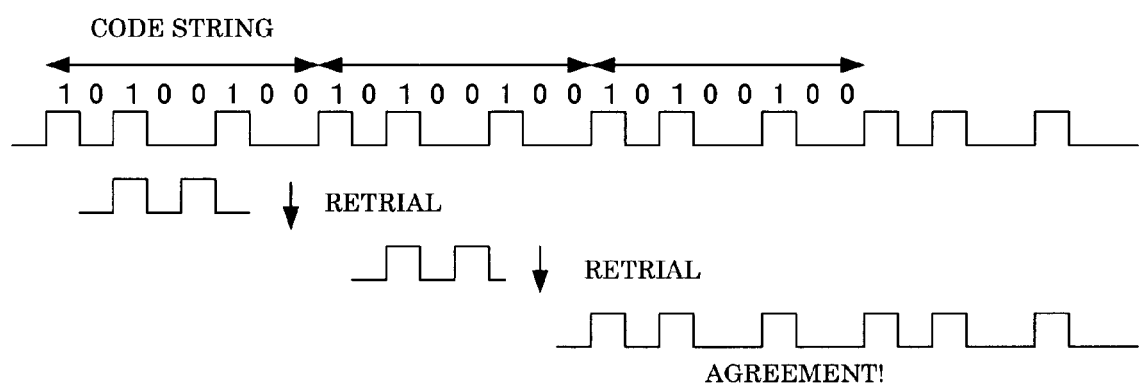

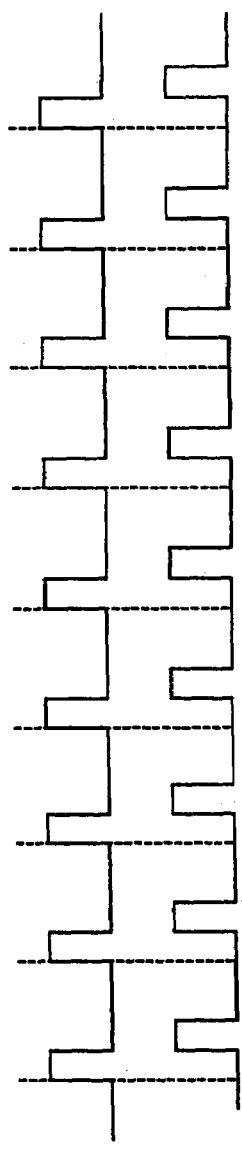

fig. 34A  TRANSMISSION SYNCHRONIZING CHANNEL STRING

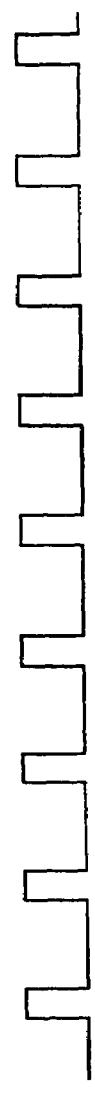

fig. 34B  SYNCHRONIZING CHANNEL STRING ARRIVING AT SLAVE

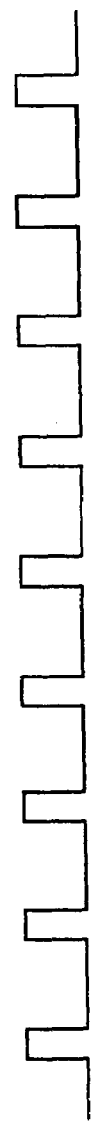

fig. 34C  SYNCHRONIZING CHANNEL STRING TOTALLY REFLECTED BY SLAVE AND ARRIVING AT MASTER

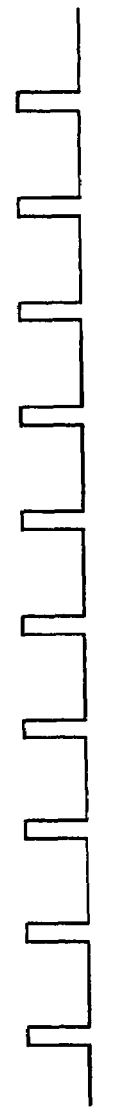

fig. 34D  SYNCHRONIZING CHANNEL STRING UNIQUELY POSSESSED BY SLAVE fig. 34E  IF REFLECTING SYNCHRONIZING CHANNEL STRING FROM MASTER BY CHANGING REFLECTION STATUS IN SYNCHRONIZING CHANNEL STRING UNIQUELY POSSESSED BY SLAVE

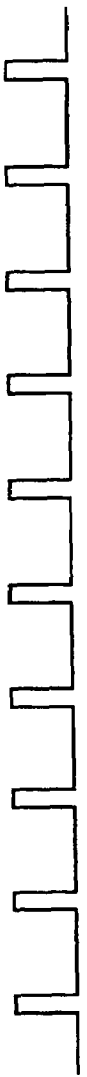

fig. 34F  IF(e) ARRIVES AT MASTER

PULSE-MODULATED WIRELESS COMMUNICATION APPARATUS

FIELD OF THE INVENTION

The present invention relates to a wireless communication apparatus using a pulse-formed modulation signal such as in a UWB (Ultra Wide Band), which is to configure a seamless network by wirelessly connecting AV apparatuses and personal computers one with another.

BACKGROUND OF THE INVENTION

In addition to the rapid spread of wireless LAN apparatuses as represented by IEEE802.11b, there is expected a society established with a seamless network by wirelessly connecting AV apparatuses and personal computers one with another. It is the urgent need to establish a technology for realizing small-sized, high-speed data communication apparatuses at low cost.

Among these, attentions are drawn to the communication scheme called UWB using pulse-formed modulation signals.

FIG. 1 shows an example of a block arrangement of a conventional UWB wireless apparatus described in PCT International Publication No. 01/93442. During transmission, transmission data in a control & interface 5101 is formed into a transmitting data string and inputted to a transmitting-function section 5102. The transmission data inputted to the transmission-function section 5102 is primarily modulated by an encoder 5103, pulse-modulated in a pulse modulator 5104, adjusted in transmission level, removed of unwanted frequency components, etc. in a transmission front end 5105, and then sent out at an antenna 5106.

During reception, the signal received at a reception antenna 5109 is received in the reception-function section 5108, adjusted to a suited level and removed of unwanted frequency in a reception front end 5110, and then inputted to a waveform correlator 5111. The correlation information generated at the waveform correlator 5111 is forwarded to a timing adjuster 5112 where it is determined in synchronism if exceeding a given correlation value. Meanwhile, in the case that the correlation information is not determined in synchronism, the synchronizing signal in the reception-function section 5108 is deviated in timing, again taking a correlation in the waveform correlator 5111. This is repeated until a synchronism is established. Thereafter, demodulation is carried out in a decoder 5113 to acquire reception data to be delivered to the control & interface 5101.

However, in the conventional arrangement UWB wireless apparatus arrangement and synchronization method therewith wherein synchronism is established by taking a waveform correlation based on a synchronous frame of the reception signal and thereafter data demodulation is carried out, it takes a long time required in synchronization thus lowering the transmission speed of actual information. Besides, there has been a problem the state occurs which the correlation pulse is at a high level due to an interference wave of a radio wave from a multipath or another apparatus. In order to resolve these problems, there is a proposal on the arrangement for removing of interference waves by determining, phase by phase, the level of a correlation pulse or providing the reception systems in plurality. However, this complicates the determination flow and increases the size of apparatus arrangement, thus increasing power consumption and raising apparatus price.

SUMMARY OF THE INVENTION

A UWB wireless apparatus is configured to send and receive synchronizing and data signals at different frequency bands (channels). Due to this, a sufficient time can be secured for synchronization. The receiver apparatus is allowed to suitably establish a synchronism with the transmitter apparatus. Because of no need for an especial synchronization time in data demodulation, it is possible to provide a small-sized, inexpensive UWB wireless apparatus for high-speed data communications.

BRIEF DESCRIPTION OF THE DRAWINGS

FIG. 2 is a block diagram showing an arrangement of a pulse-modulated wireless communication apparatus according to embodiment 1 of the present invention;

FIG. 17 is a timing chart of a synchronous channel and data channel of the wireless communication system utilizing a pulse-modulated wireless communication apparatus according to embodiment 1 of the invention;

FIG. 18A is a concept figure showing a frame structure in a communication of a wireless apparatus in the prior art, FIG. 18B is a concept figure showing a synchronizing-channel frame structure in a communication utilizing the pulse-modulated wireless communication apparatus according to embodiment 1 of the invention, and FIG. 18C is a concept figure showing a data-channel frame structure;

FIG. 19A is a pulse-signal reception start and signal blank timing waveform diagram in a communication utilizing the pulse-modulated wireless communication apparatus according to embodiment 1 of the invention, and FIG. 19B is a PPM modulation waveform diagram;

FIG. 22A is a concept figure explaining a conventional method of communications between two apparatuses in the wireless communication system utilizing the pulse-modulated wireless communication apparatus, and FIG. 22B is a concept figure of a conventional method of communications between two apparatuses according to embodiment 1 of the invention;

FIG. 23 is a waveform figure explaining a synchronism operation during demodulating communication information in the wireless communication system utilizing the pulse-modulated wireless communication apparatus according to embodiment 1 of the invention;

FIGS. 34A-34F are waveform figures explaining the procedure of reading and synchronization in a reflective radio tag system according to embodiment 4 of the invention, wherein FIG. 34A is a transmitted synchronizing channel string, FIG. 34B is a transmitted synchronizing channel string arrived at the radio tag, FIG. 34C is a synchronizing channel string totally reflected from the radio tag and arrived at a base station, FIG. 34D is a synchronizing channel string the radio tag uniquely possesses, FIG. 34E is a modulated reflection wave modulated by the radio tag, and FIG. 34F is a modulated reflection wave arrived at the base station.

DESCRIPTION OF THE EXEMPLARY EMBODIMENT

Figure 1:
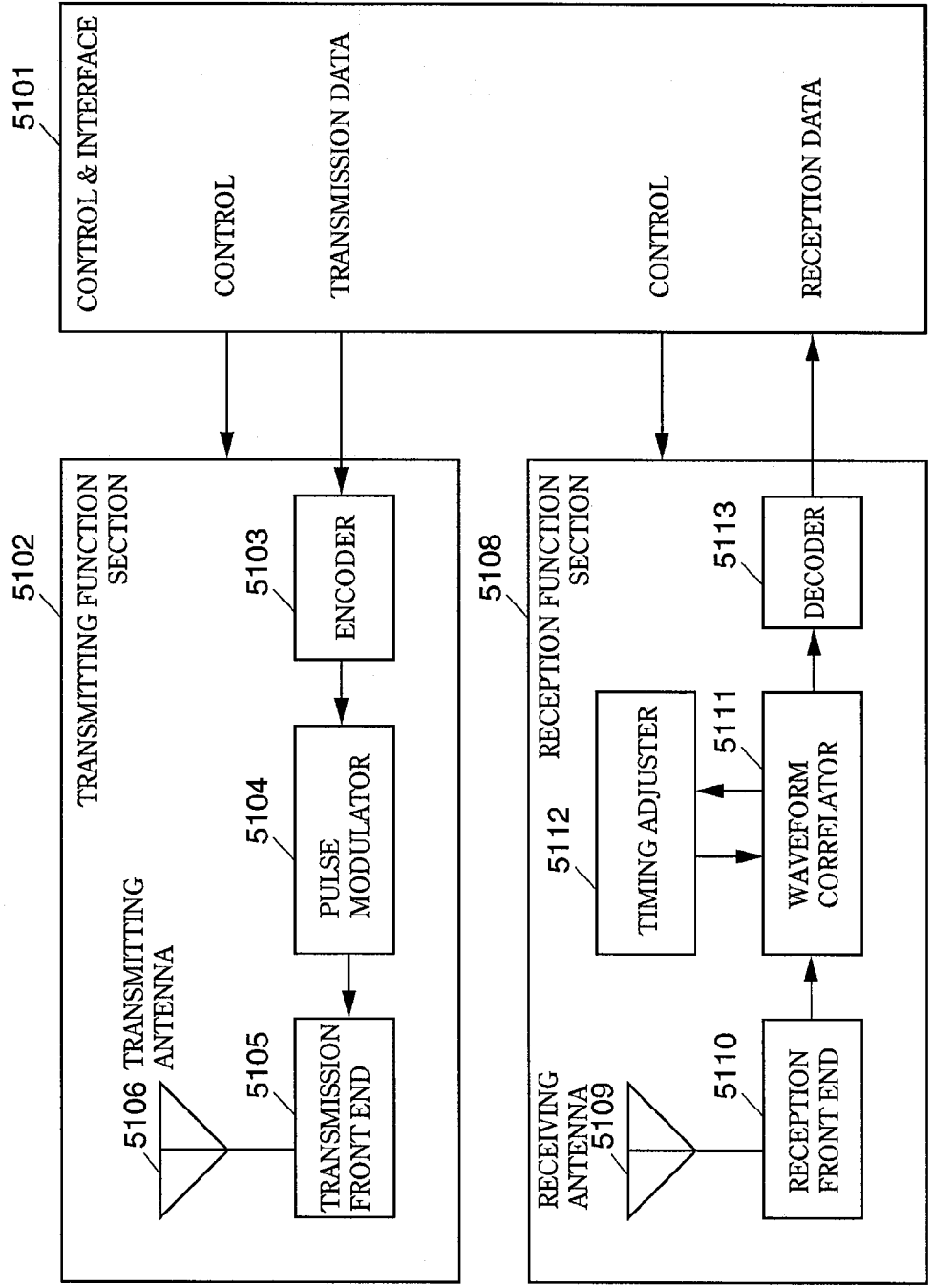
FIG. 1 is a block diagram showing an arrangement of a pulse-modulated wireless communication apparatus in the prior art.

Exemplary embodiments of the present invention are demonstrated hereinafter with reference to the accompanying drawings.

1. First Exemplary Embodiment

FIG. 2 is a schematically-shown block diagram of a pulse-modulated wireless communication apparatus in embodiment 1 of the present invention. During transmission, the transmission data obtained in a control & interface 101 is inputted as a transmission information signal to a channel setting section 104. Depending upon a synchronous-frequency channel control signal of from a synchronizing-channel control section 102 of the control & interface 101 and a data-frequency-channel control signal of from a data channel control section 103 of the control & interface 101, the channel setting section 104 generates a synchronizing signal and data signal by use of the inputted transmission information signal. The synchronizing signal is set to at least one of a plurality of frequency channels previously set by segmenting the communication frequency band, thus giving an output. The data signal is set to at least one frequency channel different from that, thereby providing an output. The respective outputs are radiated through a first transmission antenna 105 and a second transmission antenna 106.

During reception, the first receiving antenna 108 receives a first reception signal that is to turn into a synchronizing-channel signal while the second receiving antenna 109 receives a second reception signal that is to turn into a data-channel signal. The both signals are inputted to a reception demodulator 107. Depending upon a synchronous frequency channel control signal from the synchronizing-channel control section 102 and a data-frequency-channel control signal from a data channel control section 103, the reception demodulator 107 demodulates the inputted first and second reception signals to thereby generate a reception data signal, then delivering it to the control & interface 101.

Figure 3:
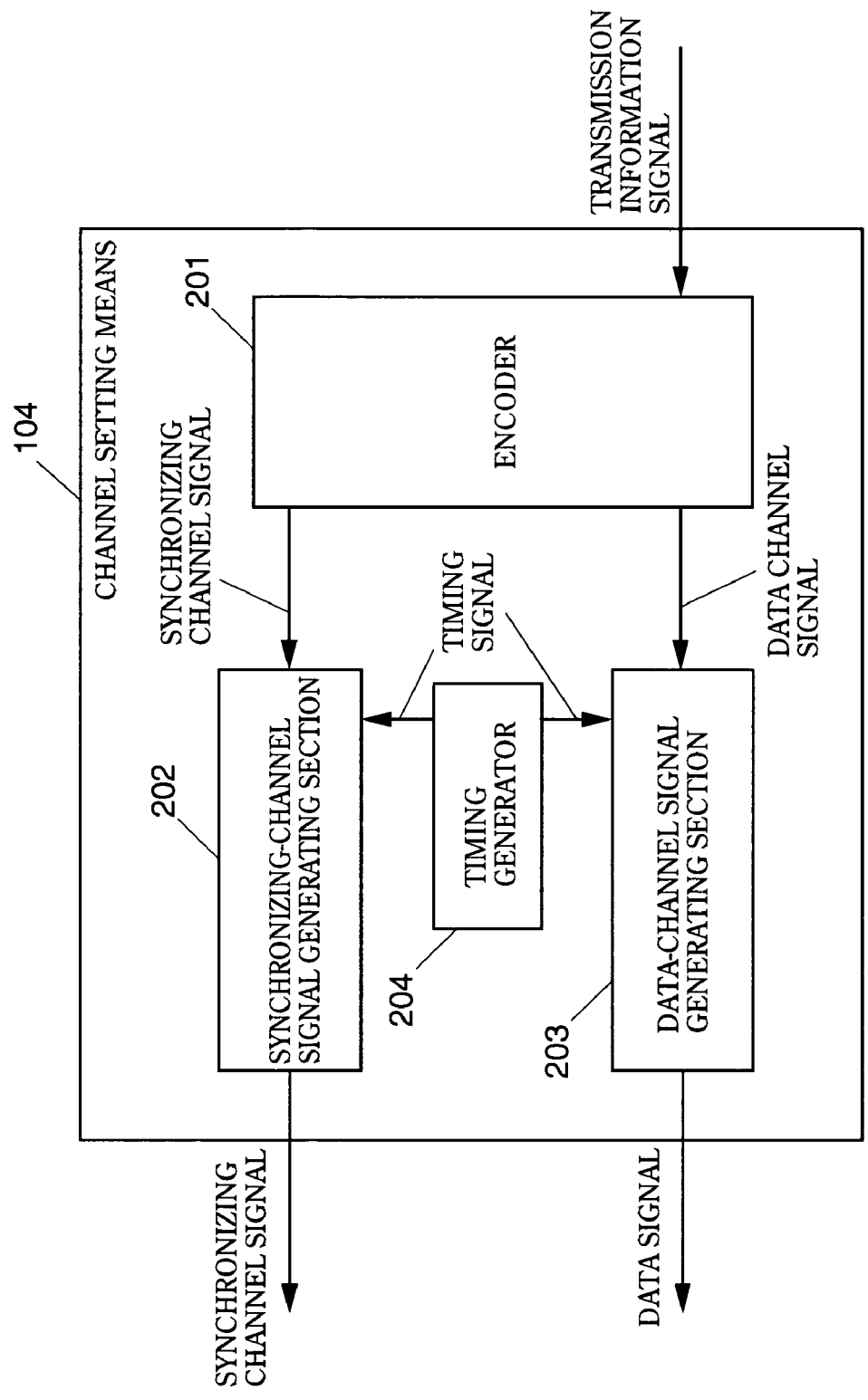
FIG. 3 is a block diagram showing a configuration of a channel setting section in a transmitter section of the pulse-modulated wireless communication apparatus according to embodiment 1 of the invention.

FIG. 3 is a block diagram showing an arrangement of the channel setting section 104 at the transmitter side. The transmission information signal, inputted in the channel setting section 104, is inputted to an encoder 201. The encoder 201 carries out a primary modulation and generates a synchronizing signal and a data-channel signal. The synchronizing-channel signal is supplied to a synchronizing-channel signal generating section 202 where it is pulse-modulated and then outputted as a synchronizing signal. Similarly, the data-channel signal is supplied to a data-channel signal generating section 203 where it is pulse-modulated and then outputted as a data signal. The synchronizing signal, outputted from the synchronizing-channel signal generating section 202, is sent out through the transmission antenna 105 of FIG. 1 while the data signal outputted from the data-channel signal generating section 203 is sent through the transmission antenna 106.

Figure 4:
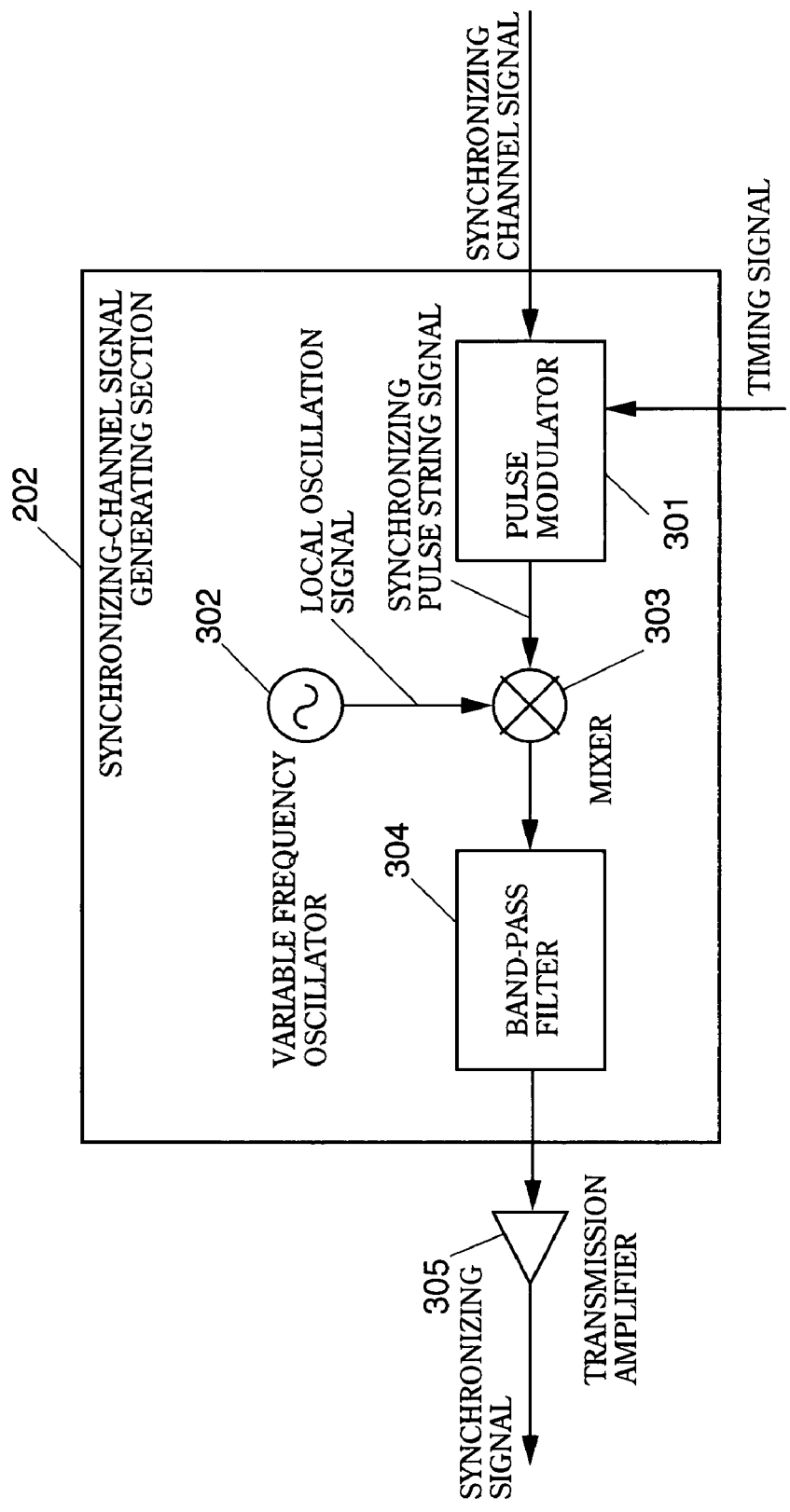
FIG. 4 is a block diagram showing a configuration of a synchronizing-channel signal generating section in the transmitter section of the pulse-modulated wireless communication apparatus according to embodiment 1 of the invention.

FIG. 4 is a block diagram showing an arrangement of the synchronizing-channel signal generating section 202. The synchronizing-channel signal generated at the encoder 201 is inputted to a synchronizing signal generating section 202 where it is pulse-modulated by a pulse modulator 301 to thereby generate a synchronous-pulse string signal. The synchronous-pulse string signal, in a mixer 303, is frequency-converted into a radio-frequency band signal by the use of a local oscillation signal of a variable frequency oscillator 302. This signal is removed of an unwanted spurious component by a band-pass filter 304 and adjusted in power level by an transmission amplifier 305, then radiated as a synchronizing signal through the transmission antenna 105.

Figure 5:
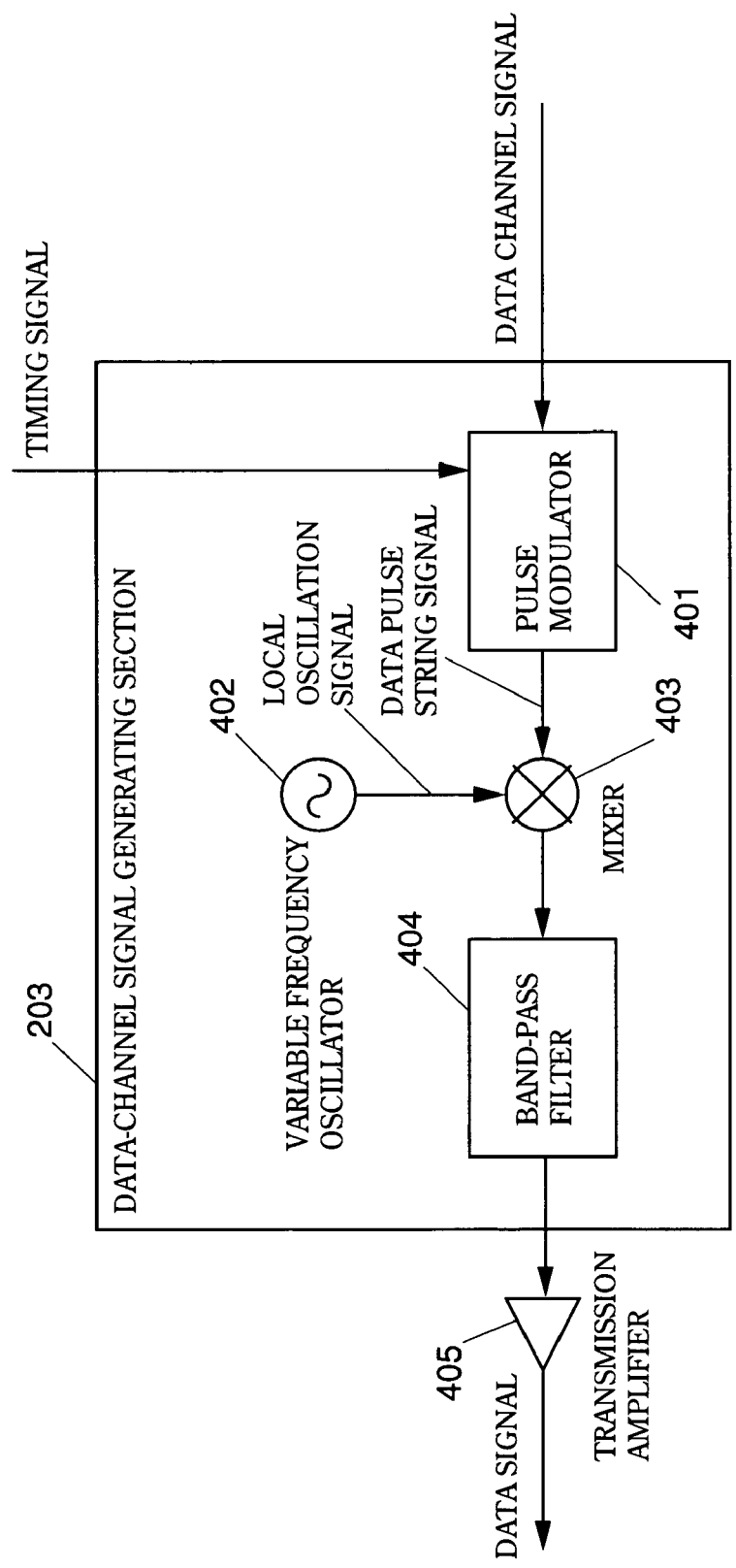
FIG. 5 is a block diagram showing a configuration of a data-channel signal generating section in the transmitter section of the pulse-modulated wireless communication apparatus according to embodiment 1 of the invention.

FIG. 5 is a block diagram showing an arrangement of the data-channel signal generating section 203. The synchronizing-channel signal generating section 202 and the data-channel signal generating section 203 are substantially the same in arrangement. This is realized with two systems, in order to set signals at channels that are different in frequency. The data-channel signal generated at the encoder 201 is inputted to a data channel signal generating section 203 where it is pulse-modulated by a pulse modulator 401 to thereby generate a synchronous-pulse string signal. The data pulse string signal, in a mixer 403, is frequency-converted into a radio-frequency band signal by the use of a local oscillation signal of a variable frequency oscillator 402. This signal is removed of an unwanted spurious component by a band-pass filter 404 and adjusted in power level by an transmission amplifier 405, then being radiated as a data signal through the transmission antenna 106.

Incidentally, in case a deviation exists between the signals of the first pulse modulator 301 within the synchronizing-channel signal generating section 202 and of the first pulse modulator 401 within the data-channel signal generating section 203, a deviation of synchronism possibly occurs during reception by the receiver apparatus. In order to prevent this, a timing generator 204 is preferably provided as shown in FIG. 2, i.e. by utilizing the timing signal from the timing generator 204, the pulse modulation timing in the pulse modulators 301, 401 is placed under control thereby correcting a deviation of synchronism.

Figure 6:
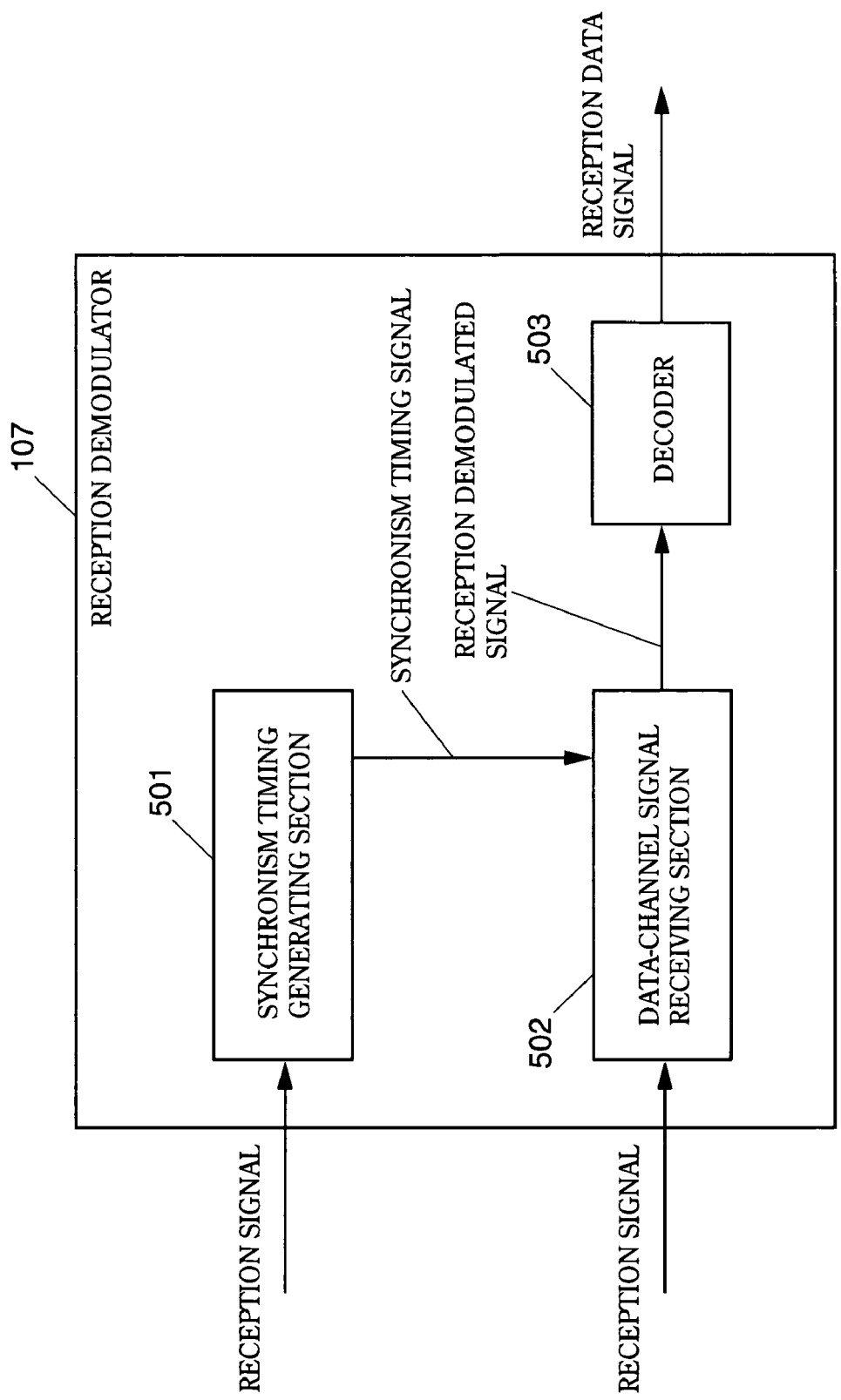
FIG. 6 is a block diagram showing a configuration of a reception demodulator in a receiver section of the pulse-modulated wireless communication apparatus according to embodiment 1 of the invention.

FIG. 6 is a block diagram showing an arrangement of the reception demodulator 107. The reception demodulator 107 is roughly divided into two blocks, on the basis of its function. Namely, one is a synchronism-timing generating section 501 which receives a first reception signal as a synchronizing-channel signal from the synchronizing-channel control section 102 and generates a synchronism timing, while the other is a data-channel signal receiving section 502 which receives a second reception signal as a data-channel signal from the data channel control section 103 in order to implement actual data communications.

The first and second reception signals inputted to the reception demodulator 107 are respectively inputted to the synchronism-timing generating section 501 and the data-channel signal receiving section 502. The synchronism-timing generating section 501, inputted with the first reception signal, generates a synchronism timing signal and outputs it to the data-channel signal receiving section 502. The data-channel signal receiving section 502 uses the synchronism timing signal generated in the synchronism-timing generating section 501 to the second reception signal, thereby demodulating a reception demodulated signal. The reception demodulated signal is decoded by the decoder 503 into a reception data signal to be delivered to the control & interface 101.

Figure 7:
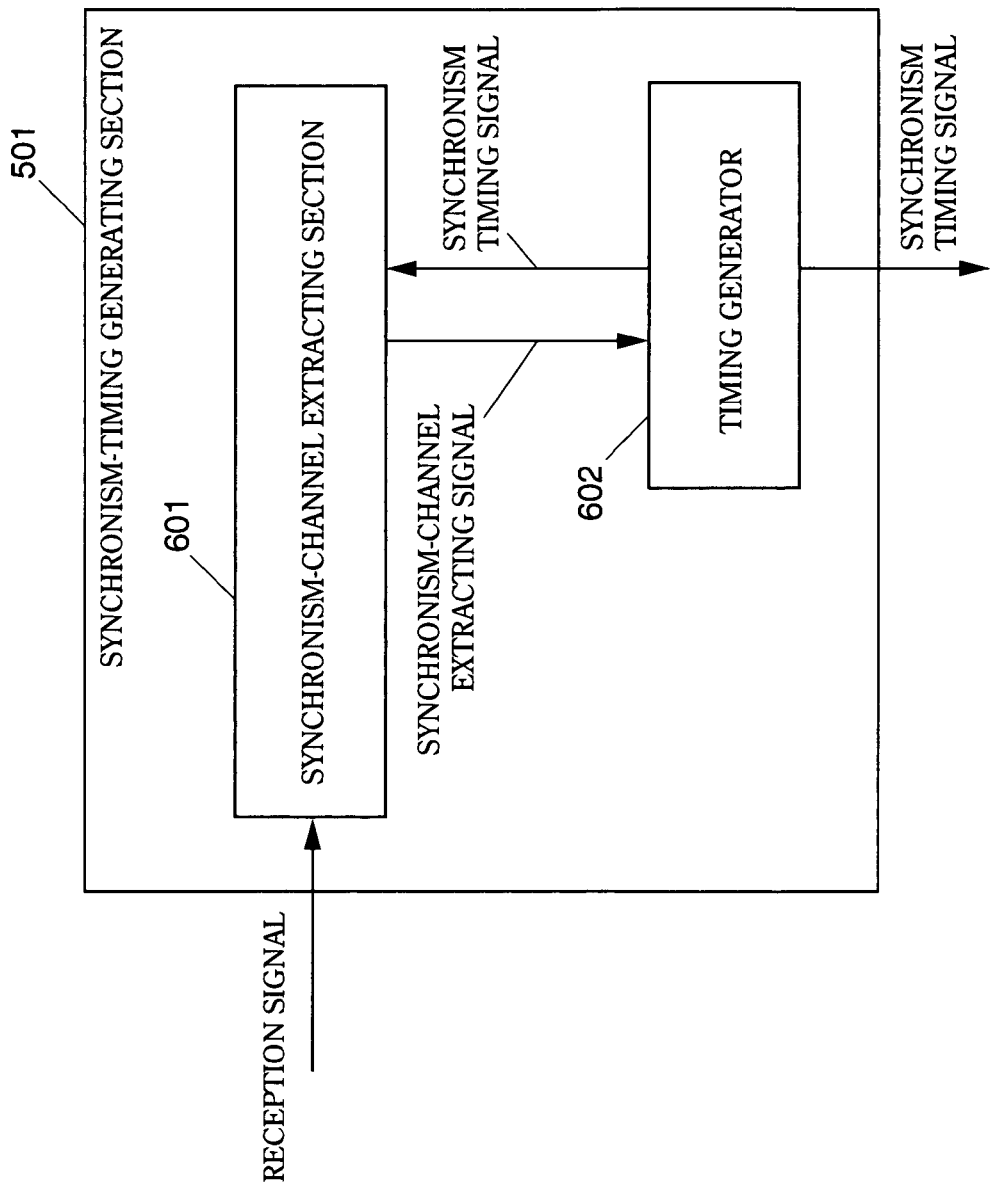
FIG. 7 is a block diagram showing a configuration of a synchronism-timing generating section in the receiver section of the pulse-modulated wireless communication apparatus according to embodiment 1 of the invention.

FIG. 7 is a block diagram showing an arrangement of the synchronism-timing generating section 501. The first reception signal inputted in the synchronous-timing generating section 501 is inputted to the synchronizing-channel extracting section 601 where only a synchronizing-channel extraction signal is extracted for use in synchronization. The timing generator 602 inputs therein the synchronizing-channel extracted signal and generates a synchronism timing signal, and outputs it to the data-channel signal receiving section 502. This synchronism timing signal is also inputted to the synchronizing-channel extracting section 601 where it is used to extract a synchronizing-channel extracted signal from the first reception signal.

Figure 8:
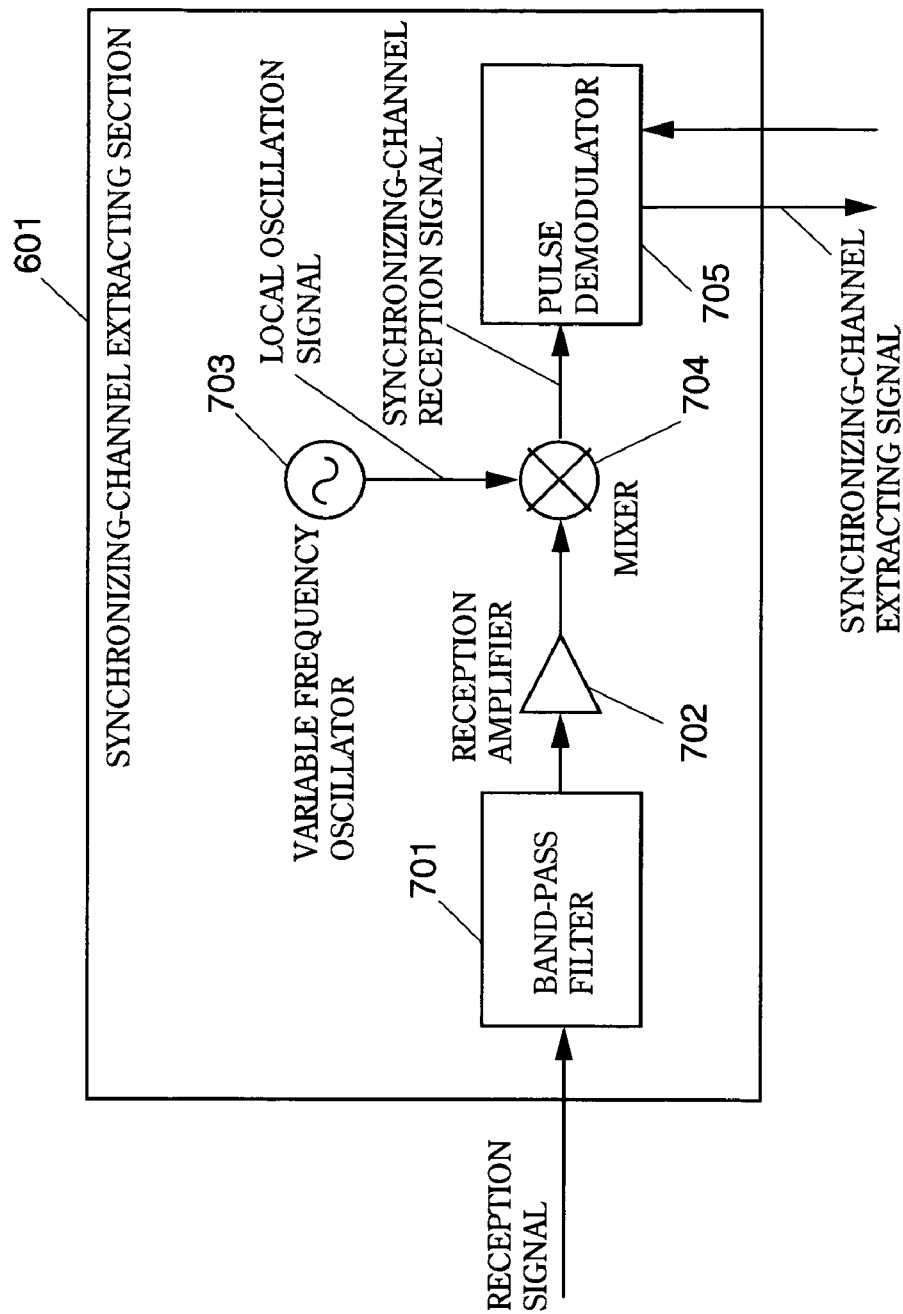
FIG. 8 is a block diagram showing a configuration of a synchronizing-channel extracting section in the receiver section of the pulse-modulated wireless communication apparatus according to embodiment 1 of the invention.

FIG. 8 is a block diagram showing an arrangement of the synchronizing-channel extracting section 601. The first reception signal received at the reception antenna 108 is removed of an unwanted frequency component by a band-pass filter 701 and then adjusted in power level by a reception amplifier 702. This signal is frequency-converted in the mixer 704 by the use of a local oscillation signal from a variable frequency oscillator 703, and then inputted as a synchronizing-channel reception signal to a pulse demodulator 705. The pulse demodulator 705 demodulates the synchronizing-channel reception signal and generates a synchronizing-channel extraction signal and delivers it to the timing generator 602, thereby establishing a synchronism. In the actual synchronism establishment, there are usable methods of immediately sampling the demodulation signal, of carrying out synchronization with delay, etc.

Figure 9:
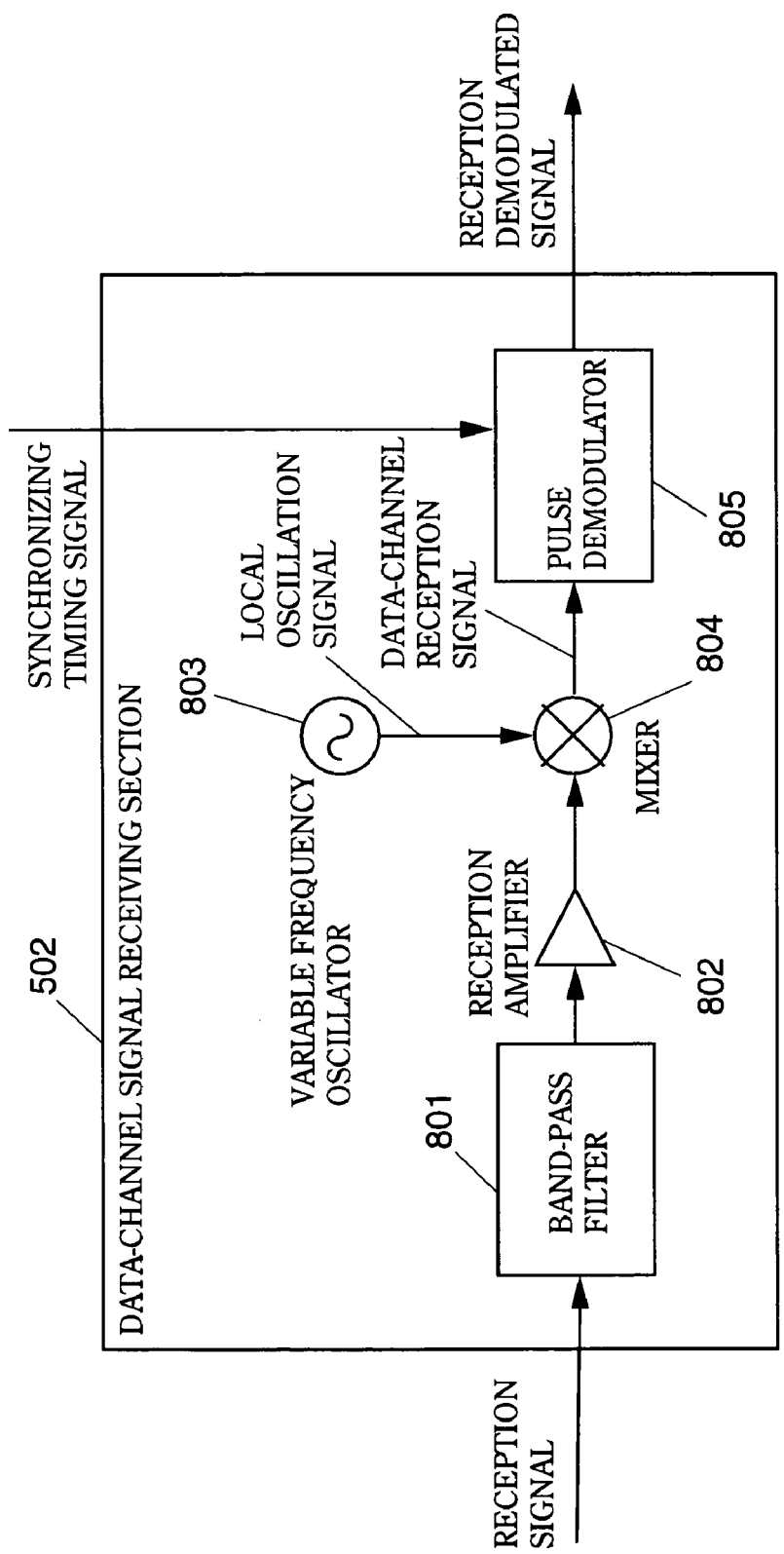
FIG. 9 is a block diagram showing a configuration of a data-channel signal receiving section in the receiver section of the pulse-modulated wireless communication apparatus according to embodiment 1 of the invention.

FIG. 9 is a block diagram showing an arrangement of the data-channel signal receiving section 502. The data-channel signal receiving section 502 is basically the same in operation as the synchronism-timing generating section 501. The difference lies in that this carries out a demodulation by the use of a synchronism timing signal generated by the timing generator 602 of the synchronism-timing generating section 501 instead of having a timing generating section. This makes it possible to demodulate the second reception signal without the need for an especial synchronous process.

The second reception signal received at the receiving antenna 109 is removed of an unwanted frequency component by a band-pass filter 801 and then adjusted in power level by a reception amplifier 802. This signal is frequency-converted in the mixer 804 by the use of a local oscillation signal from a variable frequency oscillator 803, and then inputted as a data-channel reception signal to a pulse modulator 805. The pulse demodulator 805 demodulates the data-channel reception signal by the use of a synchronism timing signal generated by the timing generator 602 and generates a reception demodulated signal to be delivered to the decoder 503.

Figure 10:
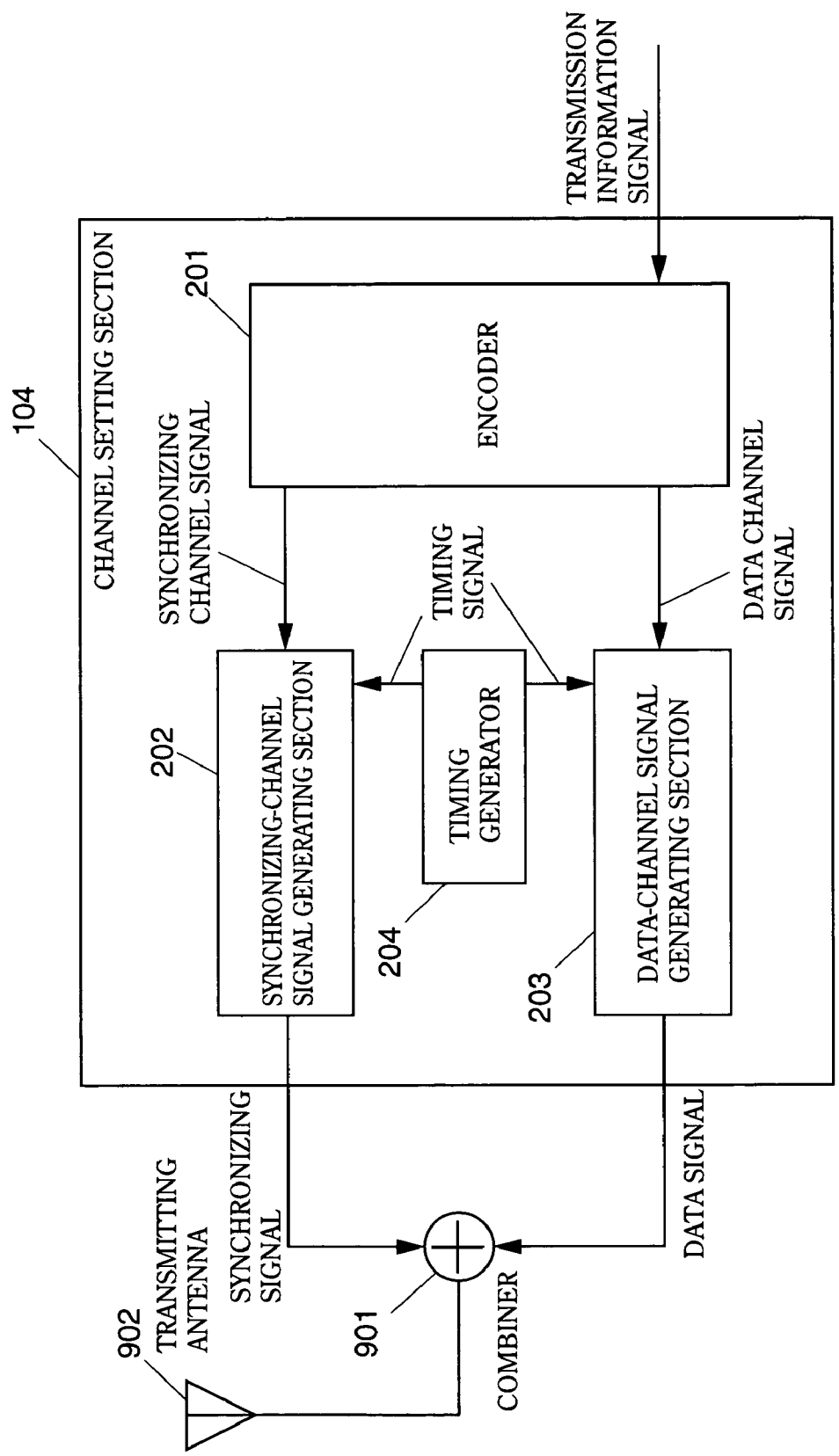
FIG. 10 is a block diagram showing another configuration of a pulse-modulated wireless communication apparatus according to embodiment 1 of the invention.

Incidentally, FIG. 2 showed the arrangement of the pulse-demodulation radio communication apparatus having two antennas used for synchronization and data in the transmitter section, and two antennas used for synchronization and data in the receiver section. However, the arrangement may be as shown in FIG. 10, i.e. the synchronization and data signals outputted from the channel setting section 104 of the transmitter section are synthesized in a synthesizer 901, and sent out through one transmission antenna 902. Likewise, the receiver section also may be arranged such that signal reception is by one receiving antenna so that the reception signal can be distributed by a distributor into two and inputted to the reception demodulator section 107.

Meanwhile, the band-pass filter 304, 404, 701, 801 preferably uses a filter variable in pass band in order to cope with various methods of channel assignment and time change in channel assignment.

Now, explanation is made on the channel assignment for synchronizing signals and data transmission. Because UWB communications use a pulse, there is widespread of spectrum over a broad band if considering on the frequency axis. However, multiplexed communications are required because of a plurality of UWB units existing within the communication area. Furthermore, it can be considered that the wireless system is given in which the frequency band applicable is segmented into a plurality of channels, in order to avoid the interference due to a common frequency band shared with other systems. Incidentally, there is a case that the frequency band possibly interfering with other systems is made unavailable.

Figure 11:
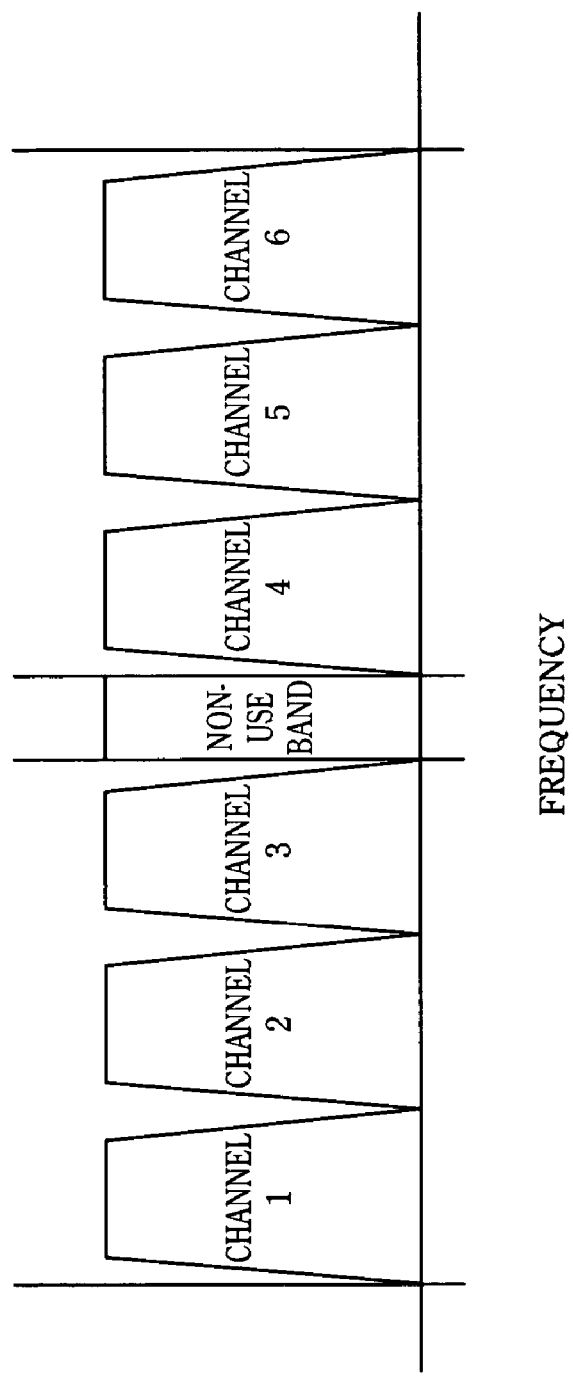
FIG. 11 is a concept figure of a frequency channel arrangement in a communication frequency band of the pulse-modulated wireless communication apparatus according to embodiment 1 of the invention.
Figure 12:
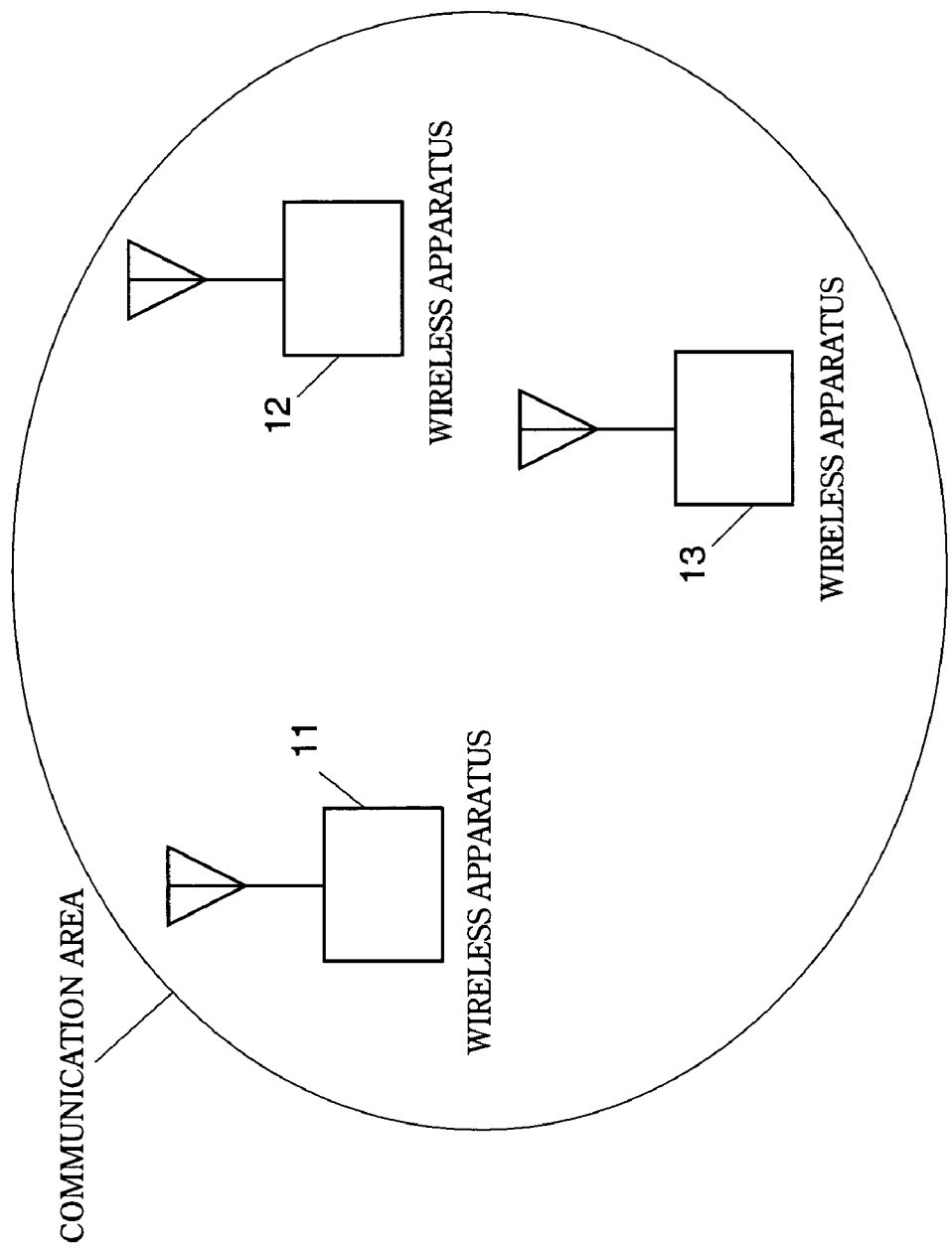
FIG. 12 is a concept figure of a wireless apparatus arrangement within a communication area for a wireless communication system utilizing a pulse-modulated wireless communication apparatus according to embodiment 1 of the invention.
Figure 13:
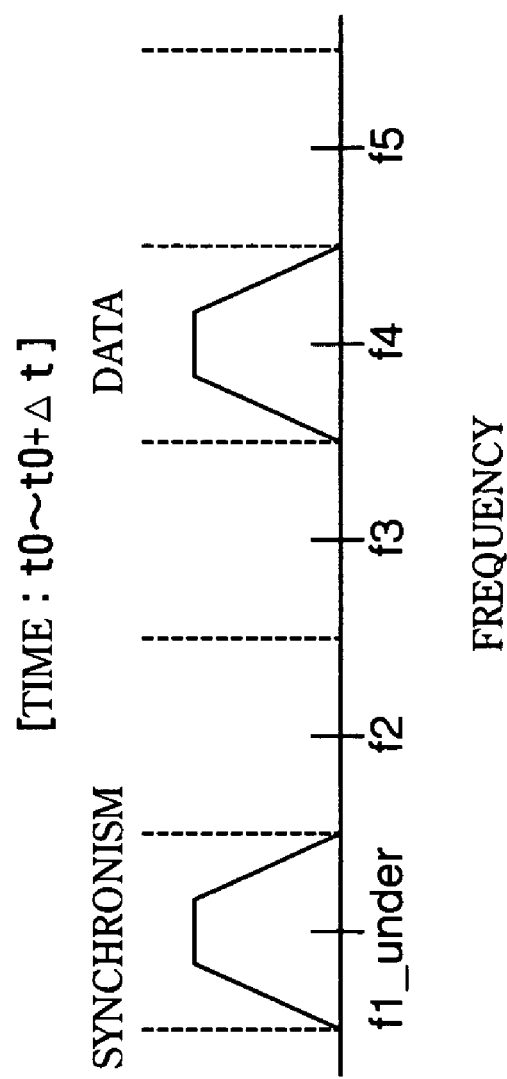
FIG. 13 is a concept figure showing an example of a frequency channel arrangement of the wireless communication system utilizing a pulse-modulated wireless communication apparatus according to embodiment 1 of the invention.

Using FIGS. 11-13, explanation is made on an example the channel is segmented into six. FIG. 11 is a concept figure of an arrangement of frequency channels within a communication frequency band. FIG. 12 is a concept figure of an arrangement of wireless apparatuses within the communication area of a wireless communication system. In order to simplify explanation, the wireless apparatuses are assumed three in the number, i.e. the first to third wireless apparatuses, within the communication area. FIG. 13 shows one example of arranging frequency channels.

In the case of receiving a signal sent from the first wireless apparatus 11 to the second wireless apparatus 12 and third wireless apparatus 13, the first wireless apparatus 11 selects, as a synchronous-frequency channel, a frequency channel 1 the lowest in center frequency (see FIG. 13). This is because, at the lower frequency, propagation loss is smaller and hence the power to reach the receiver apparatus becomes greater, wherein signal arrival is expected through a reflection or diffraction waves. For data signals, frequency channel 3 is used for the wireless apparatus 2 while frequency channel 5 is used for the wireless apparatus 3, to implement simultaneous or time-division transmission.

The wireless apparatuses 2 and 3 for reception are to receive only the synchronizing signal channel on the frequency channel 1 at a regular time interval, thereby determining the possibility of a steady synchronous establishment and communications destined for the unit concerned. In the case it is found that the communications are possible to the unit concerned, reception is made at the data-signal frequency on the basis of the channel frequency of a data signal channel received at the synchronizing signal channel and the timing information sent. Information is obtained by demodulation.

As in the wireless apparatus arrangement, the synchronizing signal and data signal are separated from each other, and exchanged at separate signal channels. This makes it possible to positively establish a synchronism, particularly on a wireless apparatus using a short pulse and long synchronous time.

It is possible to realize an inexpensive pulse-modulated wireless communication apparatus small in size but allowing for data communication at high speed.

Incidentally, this embodiment, although having explained the case having six channels, can be implemented with another number of segmentations, e.g. segmentation into two of the higher and the lower frequency channels.

Meanwhile, in the case that the UWB wireless communication apparatus is used at a frequency band, e.g. in a milli-wave band, where there is considered extremely less interference from other systems, application is possible in the form that channel segmentation is based only on spread-spectrum codes without segmenting the channel based on frequency.

Meanwhile, this embodiment explained the example that the lowest band in center frequency was selected as a synchronous-frequency channel, application is similarly possible by selecting other frequency bands.

Figure 14:
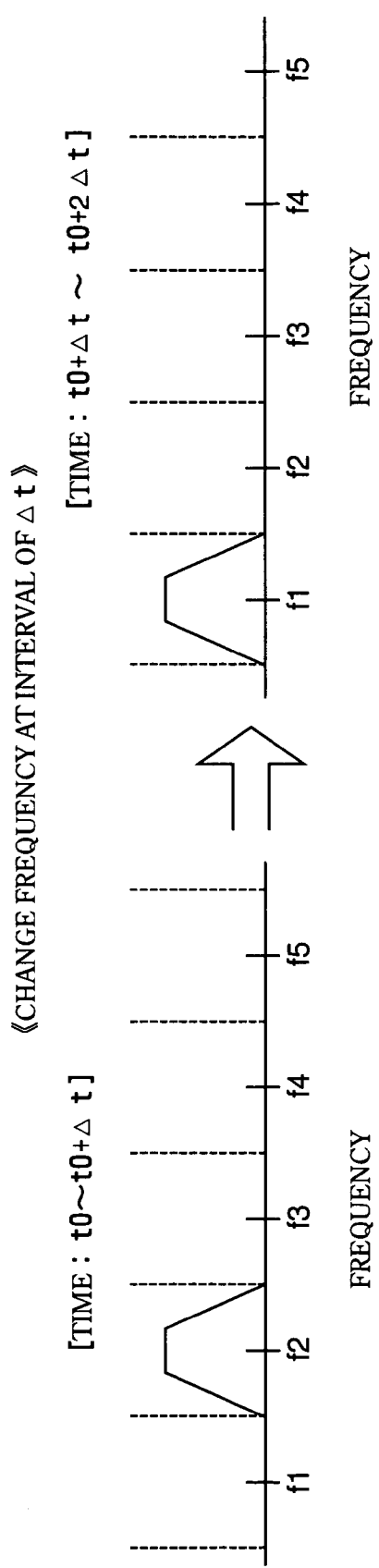
FIG. 14 is a concept figure showing another example of a frequency channel arrangement of the wireless communication system utilizing a pulse-modulated wireless communication apparatus according to embodiment 1 of the invention.
Figure 15:
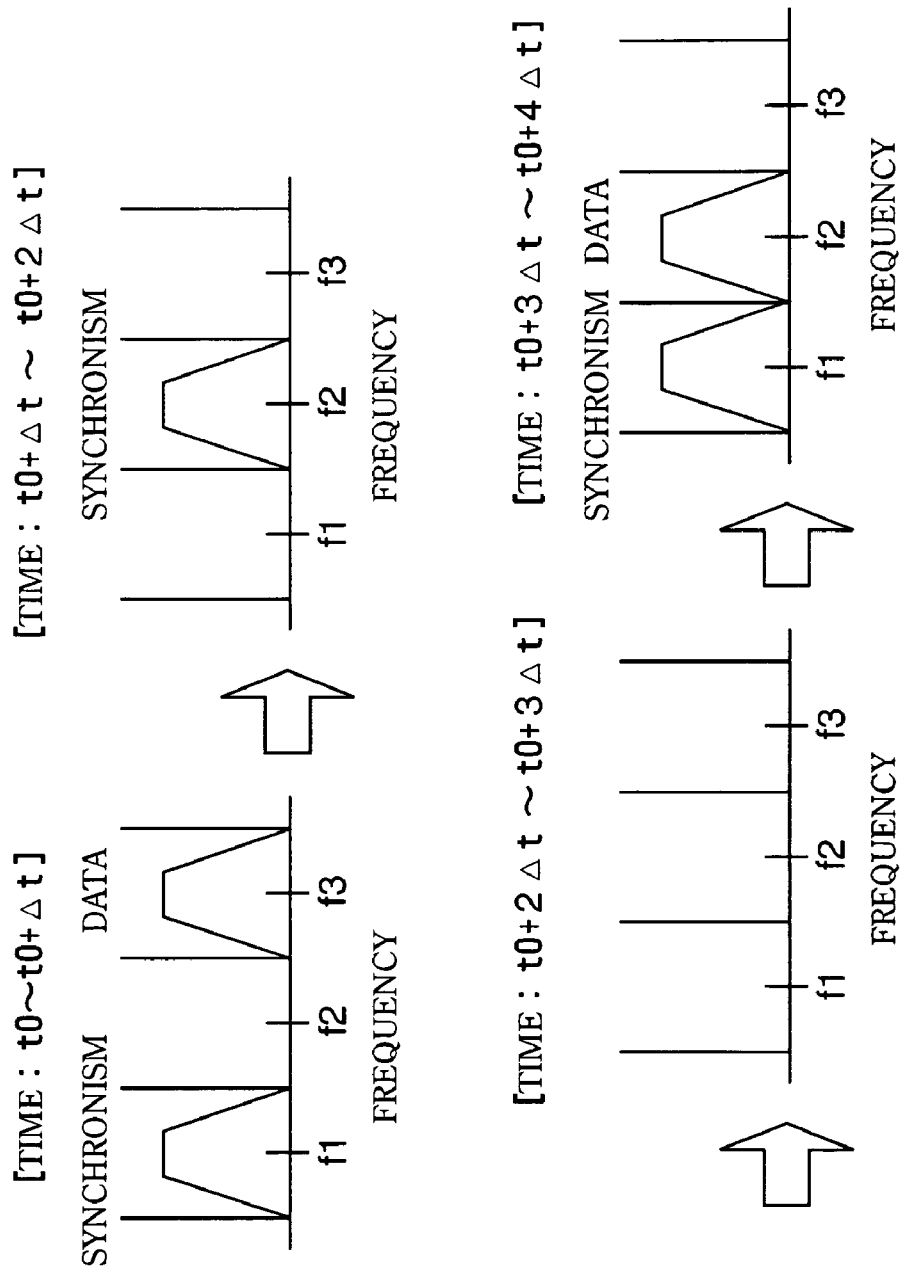
FIG. 15 is a concept figure showing still another example of a frequency channel arrangement of the wireless communication system utilizing a pulse-modulated wireless communication apparatus according to embodiment 1 of the invention.
Figure 16:
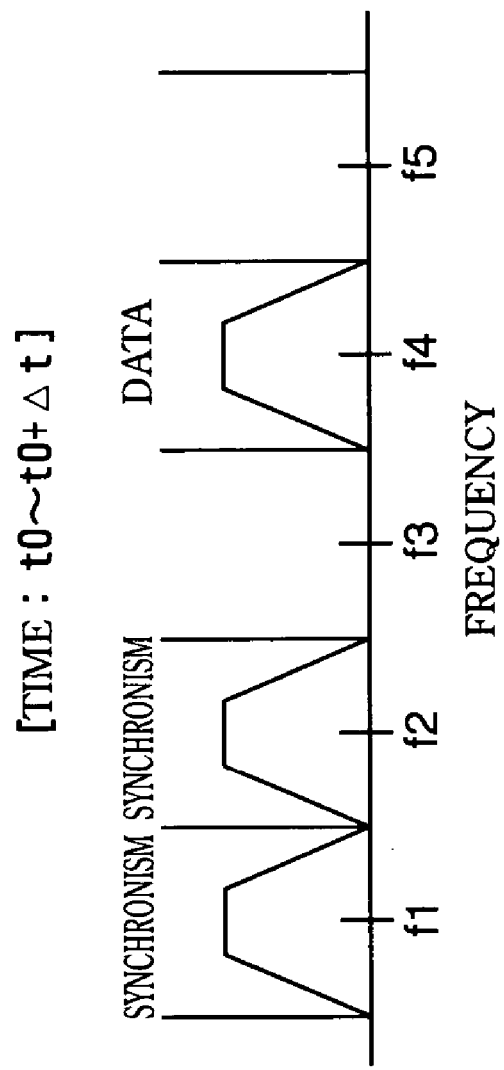
FIG. 16 is a concept figure showing yet another example of a frequency channel arrangement of the wireless communication system utilizing a pulse-modulated wireless communication apparatus according to embodiment 1 of the invention.

Incidentally, the above was explained on the example the synchronous frequency channel is taken as a fixed frequency band. However, as shown in FIG. 14, it is possible to provide an arrangement enhanced in privacy preventing against eavesdrop, etc. by making the frequency hopping at a time interval of $\Delta t$ to thereby disperse the non-sensitivity risk as caused by using a fixed frequency band and sharing the information of a hopping pattern at the receiver side.

Meanwhile, where making the frequency channel hopping, the applicable channel can be changed at the time interval of $\Delta t$.

Meanwhile, although the above explained the example to select sole one synchronous-frequency channel, positive reception at the synchronous-frequency channel is possible by simultaneous selection at two or more frequency channels.

Meanwhile, in the channel setting section 104, in case the synchronous-frequency channel is set at a plurality of frequency channels within a given time while the data-frequency-channel is set at one or less frequency channel, then transmission is possible a greater number of times over the synchronous frequency channel than over the data-frequency-channel. This makes it possible to positively receive a synchronizing signal and establish a synchronism.

Incidentally, by configuring the encoder 201 to always output a synchronizing signal at the transmitter side as shown in FIG. 17, the receiver apparatus is allowed to positively detect the synchronizing signal and appropriately confirm the synchronizing information, thus enabling data reception in a preferred state. Likewise, the synchronism-timing generating section 501 may be configured to always output a synchronism timing signal at the reception side. By allowing the synchronism-timing generating section 501 to always output a synchronism timing signal, the receiver apparatus is allowed to keep the state always in synchronism with the transmitter apparatus. This enables high-speed data communications without encountering synchronous delay.

Meanwhile, by limiting the receivable frequency channels by the receiver apparatus, radio characteristic may be satisfied in a narrower band as compared to the apparatus for reception at the entire band. This makes it possible to arrange the apparatus simpler and realize it smaller in size and lower in price.

Meanwhile, by limiting the receivable synchronizing-channel, the receiver apparatus can be segmented at the transmitter side. This makes it possible to realize a versatility of communication and service forms, e.g. segmentation in information amount, communication speed and communication area by the receiver apparatus. Meanwhile, because of reduced frequency of reception at non-related synchronous frequency channels, power consumption can be held low.

FIGS. 18A and 18B show a schematic communication frame structure for communication using the pulse-modulated wireless communication apparatus of the invention by a comparison with the frame structure on the conventional wireless apparatus.

The communication frame is to be roughly divided with a preamble/synchronous frame part for apparatus-power start up and synchronous establishment, upward and downward identification frame parts for identifying the opposite of communication, and an information frame part describing the information to actually convey. As shown in FIG. 18A, in the frame configuration in the conventional wireless apparatus, the entire process from synchronous establishment to data acquisition is carried out by one frame. In case it takes long time in synchronous establishment, the information frame part is narrowed to thereby reduce the amount of information to be sent.

On the contrary, the wireless apparatus in an arrangement of the invention, the synchronizing signal satisfactorily establishes solely a synchronism because of separated synchronous and data signals. As shown in FIG. 18B, the major part of the communication frame can be assigned to the preamble/synchronous frame part. On the other hand, the data signal does not require to establish a synchronism. As shown in FIG. 18C, it requires only a preamble part in a brief time in order for power startup, thus enabling to assign the major part of the communication frame to the data part. Accordingly, by suitably changing the ratio of the communication frame on the synchronous frequency channel and the communication frame on the data-frequency-channel, synchronism can be established more simply. Thus, it is possible to realize at low cost a wireless data communication apparatus small in size but high in data transmission speed.

Incidentally, by implementing modulation under a scheme that demodulation is easy solely at synchronous frequency channel, the arrangement may be made allowing for synchronous establishment more positively. The modulation schemes in which demodulation is easy include ASK (amplitude-shift keying), BPSK (biphase-shift keying), DSSS (direct sequence spread spectrum) and PPM (pulse position modulation), for example. Meanwhile, application is possible with a continuous signal without modulation.

Meanwhile, although the above explained the example configured by changing the frame structure and modulation scheme, the arrangement may be made to positively establish a synchronism by decreasing the transmission speed on the synchronous frequency channel as compared to that on the data-frequency channel by increasing the pulse period or the like.

Meanwhile, although the above explained the example in which the simple modulation scheme was selected, the arrangement may be made to enhance the multiplex characteristic by providing non-correlated signals in an orthogonal relationship to the synchronous and data channel signals.

Now, an example of concrete pulse signal synchronization and demodulation is described below by a comparison with that of the prior art, wherein PPM is assumably used as a modulation scheme.

Figure 20:
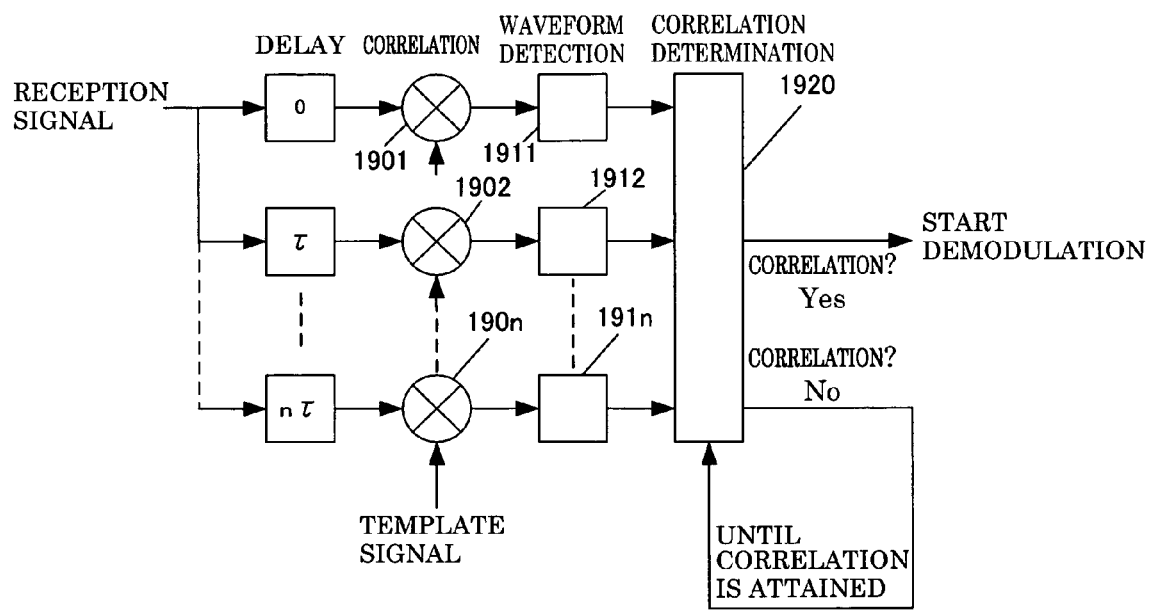
FIG. 20 is a block diagram showing an example of a receiver apparatus of the wireless communication system utilizing the pulse-modulated wireless communication apparatus according to embodiment 1 of the invention.

There are roughly two aspects in synchronization, one of which is a part to notify that a certain reception is started at any receiver apparatus and the other is a part to notify in what part of the received signal information is contained. Usually, reception start and signal blank timing are taken by receiving and demodulating a repeated part of 0 and 1 called preamble, as shown in FIG. 19A. Here, as shown in FIG. 19B, when sending "1" in PPM modulation, the pulse is delayed by $\tau$. At the reception side, as shown in FIG. 20, the reception signal is correlated on each delay time $0, \tau, 2\tau, \ldots n\tau$ with a signal called template by the correlator 1901, 1902, ... 190$n$. Each is waveform-detected by a waveform-detecting section 1911, 1912, ... 191$n$ and determined whether the reception signal is at a preamble. In the case that the correlation signal has a high correlation to take values equal to or greater than a reference value, determination is made as a preamble and demodulation is started. When a correlation is not taken, the correlation determination is continuously repeatedly on the reception signal until a correlation is obtained.

Figure 21A:
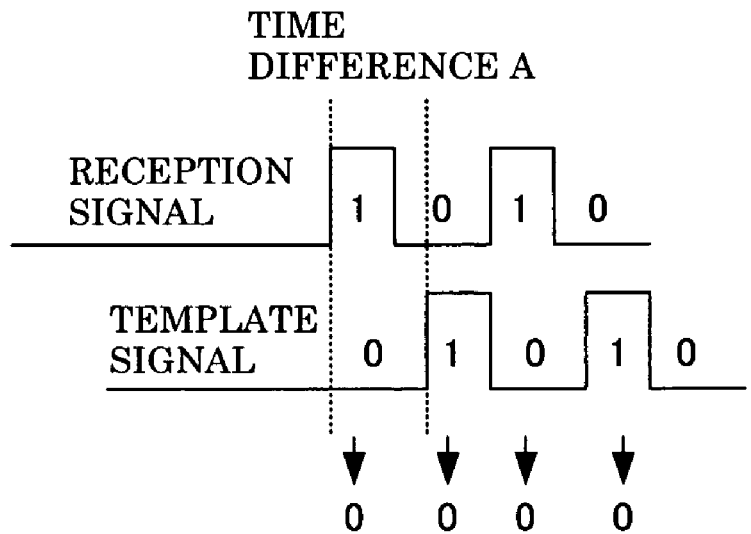
FIG. 21A is a pulse waveform diagram in the case there is a great time difference between a reception signal and a template signal in a correlation determination on the receiver apparatus of the wireless communication system utilizing the pulse-modulated wireless communication apparatus according to embodiment 1 of the invention.
Figure 21B:
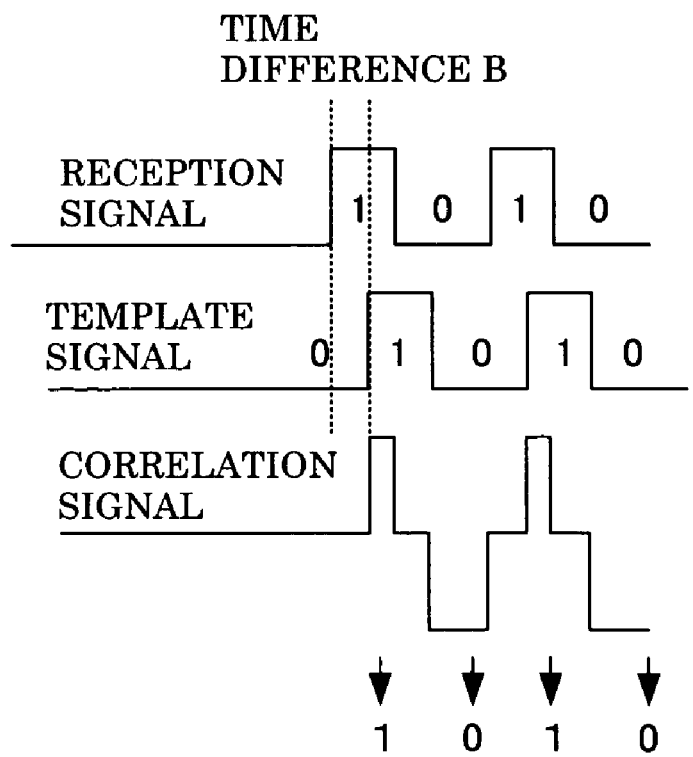
FIG. 21B is a pulse waveform diagram in the case there is a small time difference between a reception signal and a template signal.

FIGS. 21A and 21B show a pulse waveform relationship in the correlation determination. Provided that there is a time difference A between the reception signal and the template signal as shown in FIG. 21A, there is no part to take a correlation between the reception signal and the template signal. Thus, no signals appear at the waveform-detecting section 1911, 1912, ... 191$n$. In case the reception signal and the template signal should take a coincident part even slightly by such as a time difference B as in FIG. 21B, "1" and "0" appear on the correlation signal. By exceeding of the signal over a predetermined reference, i.e. as an actual signal reception, demodulation is commenced.

However, in case there is a somewhat time difference such as a time difference B, when an erroneous correlation signal be outputted due to the affection of interference waves or noises small in S/N ratio, correlation determination would result in non-correlation. This mechanism is similar for the communications using the usual carrier wave. However, in pulse communication, because the signal to take a correlation has an extremely short time width, the time for taking a correlation is extremely short. Thus, there is a need to provide a number of branches different in delay time, to repeat the foregoing process until obtaining a number of correlations.

In the prior art, actually communications are carried by an exchange as in FIG. 22A. Namely, in the case of communications between the apparatus 1 and the apparatus 2, the apparatus 1 sends, to the apparatus 2, a piece of "identification information" desired for communication attached with a "preamble" notifying a signal start. The apparatus 2 determines a signal start while suitably delaying the signal, and then starts to modulate the "identification information". The apparatus 2, after confirming the "identification information", sends a piece of "identification confirmation information" attached with a "preamble" back to the apparatus 1, thus notifying a fact of communication OK. The apparatus 1 similarly carries out an operation to determine a signal start while suitably delaying the "identification confirmation information" attached with the "preamble". After confirming the "identification confirmation information", it sends a piece of "identification information" attached with a "preamble". From then on, transmission is repeated until a synchronism is obtained each time of transmission at the reception side. In this conventional scheme, there is a significant reduction in the actual throughput because of waiting for a correlation determination.

The present invention, at before first receiving identification information and starting a synchronization, is similar to the conventional scheme. However, once synchronization is attained, by suitably exchanging "identification information" attached with "preamble" at a frequency channel different from that of "communication information", the "communication information" exchanged between the apparatus 1 and the apparatus 2 is always in a state a synchronism is established. Accordingly, it become possible to send "communication information" attached with "brief preamble" that signal start notifies. Because there is no reduction in throughput due to re-sending, high-speed communications can be realized.

Now, explanation is made on a synchronization of during demodulating the "communication information". The "preamble", even if demodulated at the other apparatus than a subject of communication for example, causes less problem because of shortened synchronous time and absent actual description of information in this part. However, demodulating the "communication information" at the other apparatus than a subject of communication is problematic in respect of information leak and multiplexing. For this reason, it is a general practice to use a given code string as shown in FIG. 23 instead of a simple repetition of "1" and "0" as a template signal. By detecting an agreement with the code string, the above problem is avoided. The longer code string the template signal uses, the greater the difficulty is in demodulation at the other apparatus than a subject of communication. However, as the longer code string is used, the longer the time is required for agreement at between a reception signal and a template signal of the station concerned. Particularly, in pulse communications, because signal correlation time is quite short to readily cause signal error, it raises a problem to increase the time for which the reception signal and the template signal of the station concerned are in agreement, i.e. synchronous time.

Figure 24:
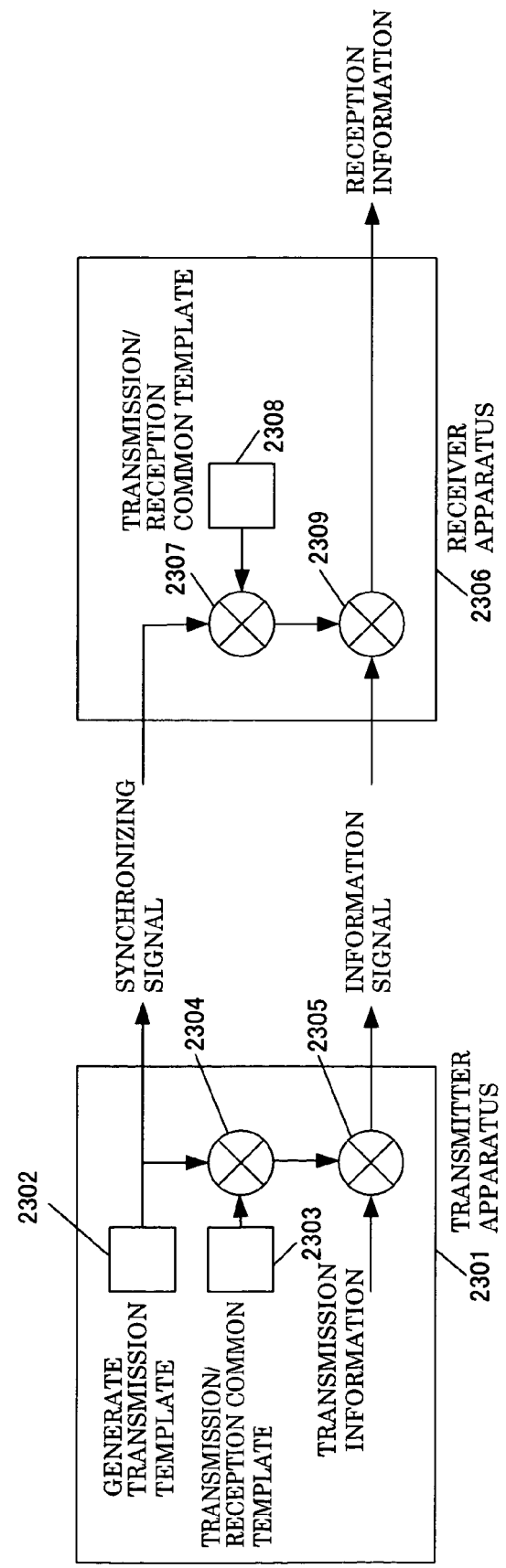
FIG. 24 is block diagram of the transmitter and receiver apparatuses in the wireless communication system utilizing the pulse-modulated wireless communication apparatus according to embodiment 1 of the invention.

In this case, it is a conventional practice to employ a scheme in which template signal agreement is determined stage by stage to take an agreement through a multiplicity of stages. In this method, synchronism time can be shortened as compared to that of the method of determining a synchronism by taking correlations on all the code strings. However, as the code string is longer, the number of times of retrials increases, requiring to make the circuit multiple in stage. Therefore, in the invention, a new template is prepared for the transmitter apparatus 2301 by multiplying by a multiplier 2304 a transmission template signal generated by a transmission template generating section 2302 with a transmission/reception common template 2303 for sharing information between transmission and reception, as shown in FIG. 24. By the multiplication of the new template and transmission information by the multiplier 2305, an information signal is prepared. Both of the prepared information signal and the synchronizing signal from the transmission template generating section 2302 are sent to the receiver apparatus 2306.

The receiver apparatus 2306 receives both the synchronizing signal and the information signal from the transmitter apparatus 2301. The synchronizing signal is converted at a transmission/reception common template 2308 by an adder 2307, which is multiplied with the information signal by an adder 2309 thereby obtaining reception information. In this case, by previously taking a synchronism of the synchronizing signal with the transmission/reception common template 2308 of the receiver apparatus 2306, it is possible to always prepare the template in synchronism with the received information signal. The method of the invention, using the transmission template per se in demodulation, eliminates the necessity of repetitively taking synchronisms. Thus, code string length and synchronization time are placed out of relationship.

Incidentally, by providing a slower signal to the transmission/reception common template than that of the transmission template, synchronization is readily established on the two signals.

Figure 25:
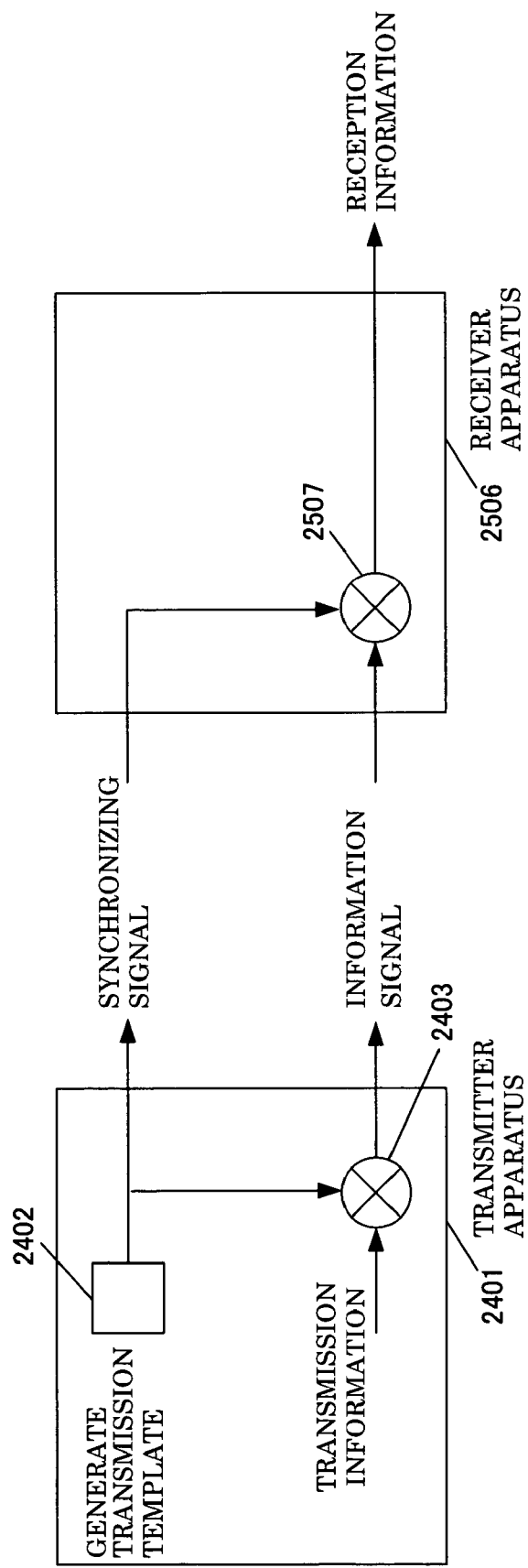
FIG. 25 is block diagram of the transmitter and receiver apparatuses according to another configuration in the wireless communication system utilizing the pulse-modulated wireless communication apparatus according to embodiment 1 of the invention.
Figure 26:
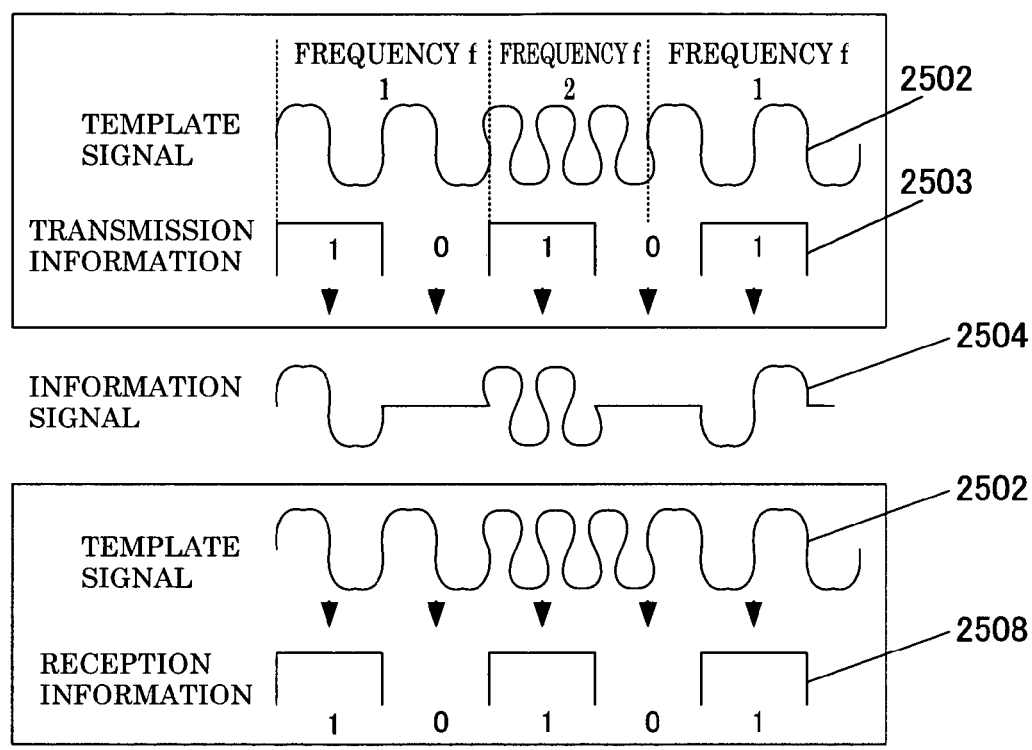
FIG. 26 is a waveform figure explaining the operation of the wireless communication system of FIG. 25.

Although the above explained the example that the transmission template signal used a non-continuous signal, it may use a sinusoidal wave. With reference to FIGS. 25 and 26, explanation is made on an example that a frequency-modulated sinusoidal wave is used as a transmission template signal.

In a transmitter apparatus 2401, a transmission template generating section 2402 generates a frequency-modulated template signal 2502. This signal is multiplied by transmission information 2503 by a multiplier 2403, thus enabling to send, as an information signal 2504, a signal nearly equal in frequency band in which the spectrum is spread, but different in center frequency. In a receiver apparatus 2406, the template signal 2502 as a received synchronizing signal and the information signal 2504 are multiplied together by a multiplier 2407, thereby extracting reception information 2508. With this arrangement, the information signal 2504 can be suitably changed in center frequency by merely frequency-modulating a template signal.

Incidentally, the above explanation showed the example using the frequency-modulated signal as a template signal, application is similarly possible with the use of a phase-modulated signal. In this case, because the phase of a sinusoidal wave changes in the pulse though there is no change in center frequency, demodulation is unavailable without using a template signal.

The above explanation showed the case using a modulated template signal only in synchronization timing. On the other hand, the identification information about the receiver apparatus may be modulated and sent by a template signal to thereby identify the receiver apparatus.

Meanwhile, both a non-continuous signal template and a continuous sinusoidal-wave template may be provided in transmission template generation so that they can be switched over during use. The criterion of switchover is, for example, communication distance, reception error rate and so on. The merit of using a non-continuous template signal lies in that radio wave radiation time is shorter and transmission power per unit frequency is low so that there is less multiplexing and interference to other apparatuses whereby the device used can be suppressed low in signal level to thereby realize the apparatus low in consumption power. The problem lies in that because of the necessity of receiving a signal in a broad band, there is interference by the signal issued from other apparatuses and communication sensitivity deterioration due to receiver NF increase.

On the contrary, the merit of using a continuous template signal lies in that, because receiving a signal in a narrow band, the use of a filter eliminates the necessity of receiving a signal from another apparatus thus improving NF hence increasing communication distance. The problem lies in the interference to another apparatus due to increased transmission power per unit frequency and apparatus consumption power increase due to an arrangement of transmitter system free from occurrence of strain and the like. In this respect, it can be considered that, for example, the non-continuous template signal is suited for short-distant communications while the continuous template signal for long-distance communications. Therefore, assuming that the distance between the transmitter apparatus and the receiver apparatus is known, it is possible to use, by switchover, a non-continuous template signal for the application of a short communication distance and a continuous template signal for the application of a long communication distance.

Meanwhile, switchover may be made such that, at a high error rate, synchronizing signal error is considered high and a continuous template signal is used for positive synchronization while, at a low error rate, a non-continuous template signal is used.

Meanwhile, by using as a synchronizing signal an CPU system clock of an apparatus mounting a pulse-modulated wireless communication apparatus, the CPU system clock can be shared between a plurality of apparatuses. This can reduce the parts used and make a signal processing in synchronism between the different apparatuses.

Incidentally, the above did not explain on level adjustment of the synchronizing signal, information signal, transmission information and template signal. However, it is natural that signal level adjustment is to be made by an amplifier or the like, depending upon the device used in multiplication processing and correlation processing.

Likewise, it is natural that, when demodulating an information signal, amplification is made by a low-noise amplifier to thereby raise the ratio of signal power to noise thus improving reception sensitivity.

2. Second Exemplary Embodiment

Figure 27:
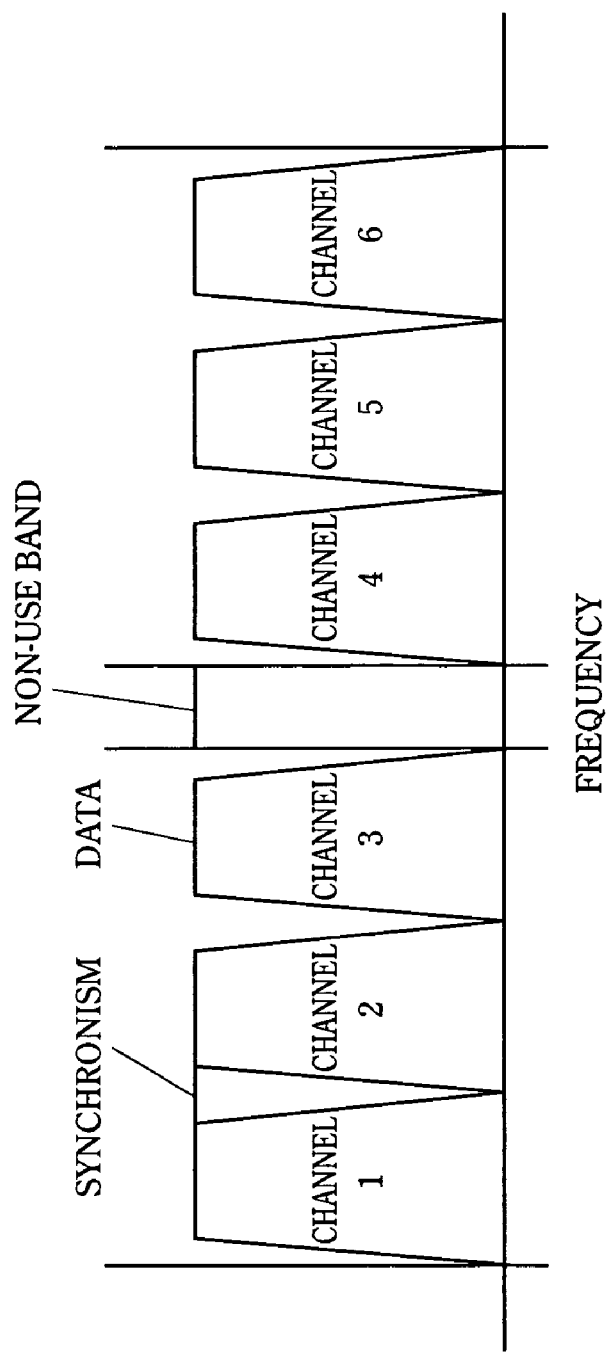
FIG. 27 is a concept figure showing an example of a frequency channel arrangement in a communication band of a pulse-modulated wireless communication apparatus according to embodiment 2 of the invention.

FIG. 27 shows an example of an arrangement of frequency channels within the communication band on the pulse-modulated wireless communication apparatus according to embodiment 2 of the invention. The difference from embodiment 1 lies in that a synchronous-frequency channel and data-frequency channel use a plurality of frequency channels in the form of a bundle.

FIG. 27 is an example that frequency channel 1 and frequency channel 2 are taken as synchronous-frequency channels while frequency channel 3 is as a data-frequency channel, to provide the synchronizing frequency channel with a band twice the band of the data-frequency channel. In UWB communications, peak power can be suppressed low by broadly dispersing the pulse over the frequency axis. Conversely, by integrating the signal dispersed broad, the total power upon demodulation can be increased. Accordingly, by varying the transmission band, the power reaching the receiver apparatus can be varied. In FIG. 27, power double in amount at the synchronizing frequency channel with respect to that at the data-frequency channel can be received, thus enabling to receive a synchronizing signal more positively. Conversely, by limiting the transmission at the data-frequency channel to one frequency channel, the affection on other apparatuses can be reduced to a minimum.

Incidentally, the above explained the example that the synchronous-frequency channel was broadened in band. Conversely, by broadening the band of the data-frequency channel, communications in greater capacity is made possible.

Figure 28:
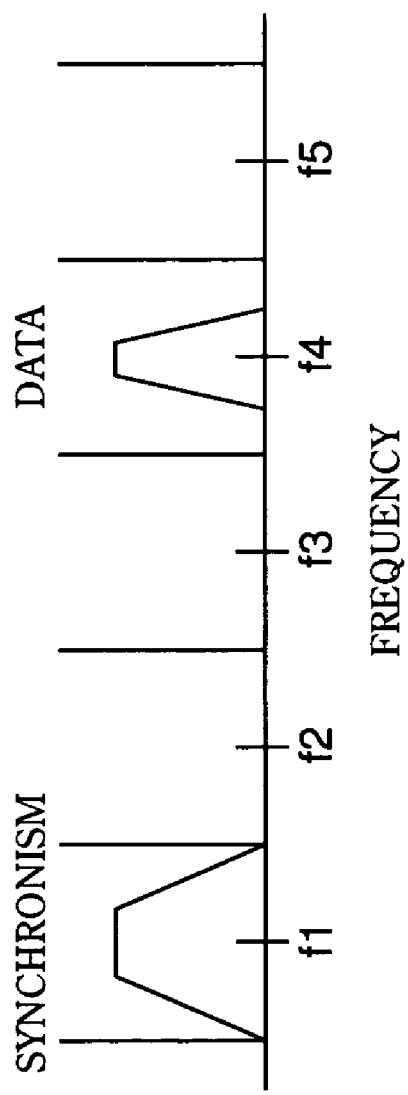
FIG. 28 is a concept figure showing an example of another frequency channel arrangement in a communication band of a pulse-modulated wireless communication apparatus according to embodiment 2 of the invention.

Meanwhile, the above explained the example using a bundle of a plurality of frequency channels. However, as shown in FIG. 28, application is similarly possible with the spectrum controlled for distribution in one part of the assigned frequency channel.

Incidentally, the synchronizing frequency channel and data-frequency-channel can be controlled in their use frequency ranges such that the total of the both is fallen within the occupation band.

Meanwhile, the above explained the example that the transmission power per unit frequency is assumed constant wherein the power the receiver apparatus is to receive is changed by changing the frequency band used in transmission. However, instead of changing the frequency band, by optionally changing the output power per unit frequency based on the communication state communications are possible at the total transmission power taken constant or required minimum of the transmitter apparatus. This can realizes an apparatus reduced in the interference to other apparatuses. Incidentally, the criterion of varying the output power may use communication distance or reception-data error rate, similarly to embodiment 1. Although the detail is omitted because of the similarity to embodiment 1, the transmission power for synchronizing signals is increased and the transmission power for data signals is decreased where communication distance is long or reception data error rate is great. Conversely, where communication distance is short or reception data error rate is small, it is satisfactory to decrease the transmission power for synchronizing signals and increase the transmission power for data signals.

3. Third Exemplary Embodiment

Figure 29:
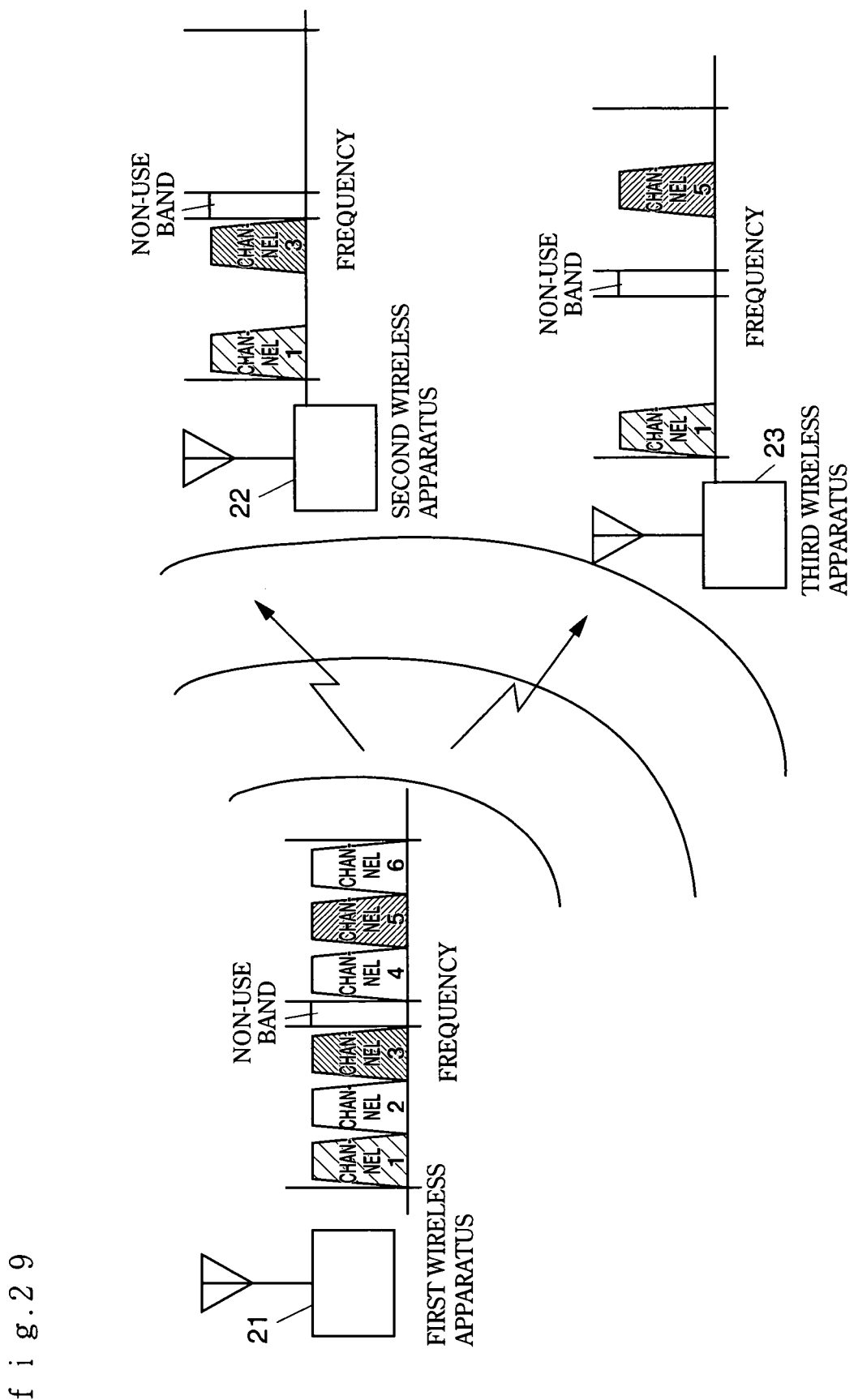
FIG. 29 is a concept figure showing an employing example of a wireless communication system according to embodiment 3 of the invention.
Figure 30:
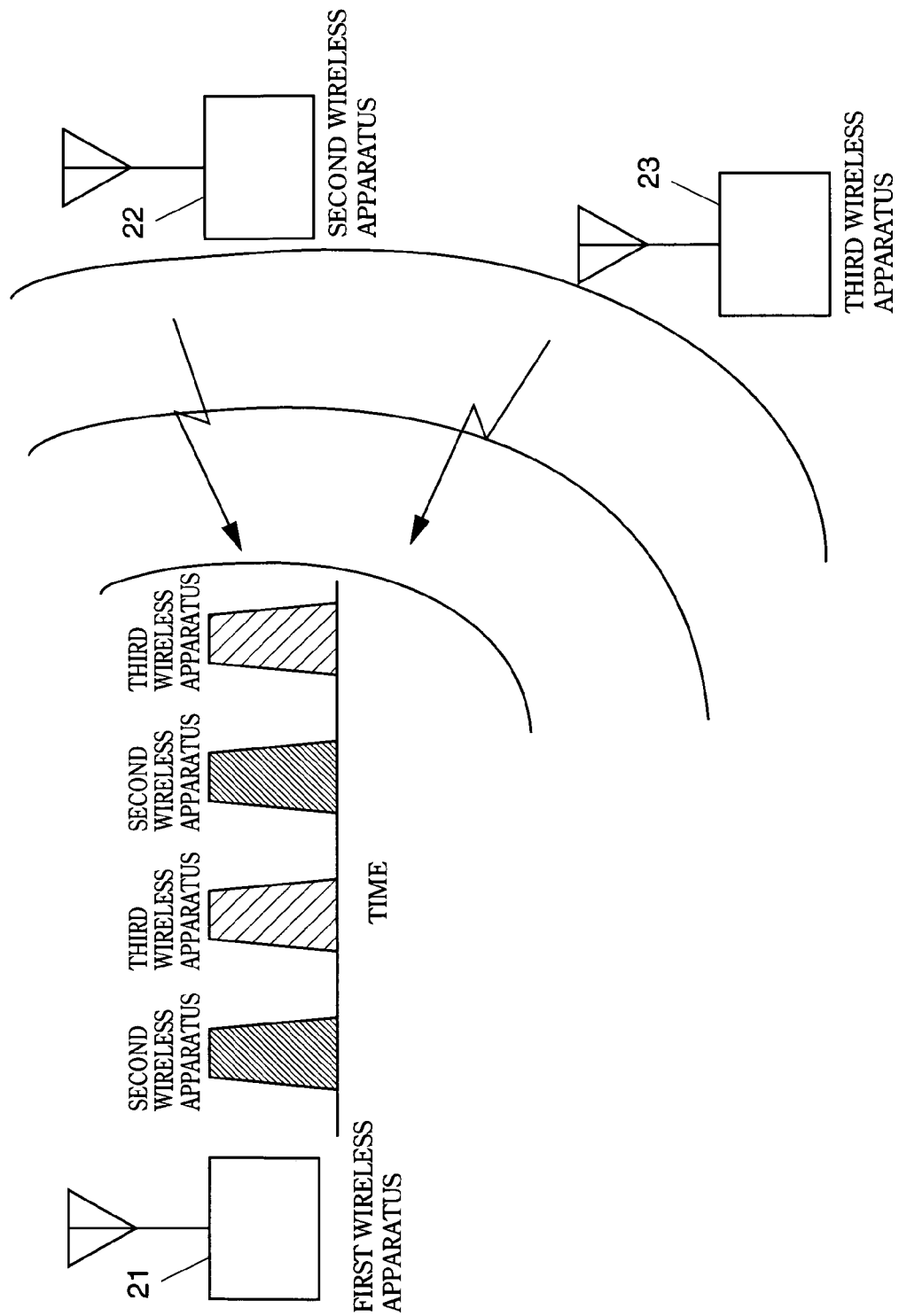
FIG. 30 is a concept figure showing another employing example of a wireless communication system with a pulse-modulated wireless communication apparatus according to embodiment 3 of the invention.

FIGS. 29 and 30 are concept figures showing an employment of a wireless communication system using the pulse-modulated wireless communication apparatus according to embodiment 3 of the invention as a communication terminal for data transmission. This embodiment shows an example arranged with three wireless apparatus. In FIG. 29, the first wireless apparatus 21 is employed as a base station which sends a signal at a synchronizing frequency channel and data-frequency channel to a second wireless apparatus 22 and third wireless apparatus 23. The second wireless apparatus 22 and third wireless apparatus 23 receive a signal sent from the first wireless apparatus 21 and extract only a signal at the synchronous-frequency channel and data-frequency channel. In this occasion, because the signals, sent from the first wireless apparatus 21 to the second wireless apparatus 22 and third wireless apparatus 23, use different frequency channels, those may be sent simultaneously or at different time.

In the case of transmission of from the second wireless apparatus 22 and third wireless apparatus 23 as in FIG. 30, transmission is possible at different frequency channels. However, this results in reception and demodulation in parallel processing at the first wireless apparatus 21, thereby increasing the circuit scale. Therefore, this embodiment shows an example of transmission using time-division made at predetermined timing.

By the above configuration, a wireless system can be realized which uses a pulse-modulated wireless communication apparatus small in apparatus size and low in price but capable of sending data at high speed.

Incidentally, the above explanation showed the example of a communication terminal unit for data transmission. For example, in case the second wireless apparatus 22 sends a signal after a lapse of a given time T in response to the signal of from the first wireless apparatus 21, the first wireless apparatus 21 is allowed to calculate a distance of between the apparatuses by conducting a simple calculation of:

communication distance={(lapse time from sending to reception)−(time T)}/radio-wave propagation velocity/2.

With a similar configuration, a wireless distance-measuring system can be realized which uses a pulse-modulated wireless communication apparatus small in apparatus size, low in price and low in interfering with another apparatus but capable of measuring a distance between the apparatuses.

Incidentally, in the above wireless distance-measuring system, a wireless positioning system capable of positioning by arraying the reception antenna of the first wireless apparatus 21 and measuring a distance of each antenna and the second wireless apparatus 22.

4. Fourth Exemplary Embodiment

Figure 31:
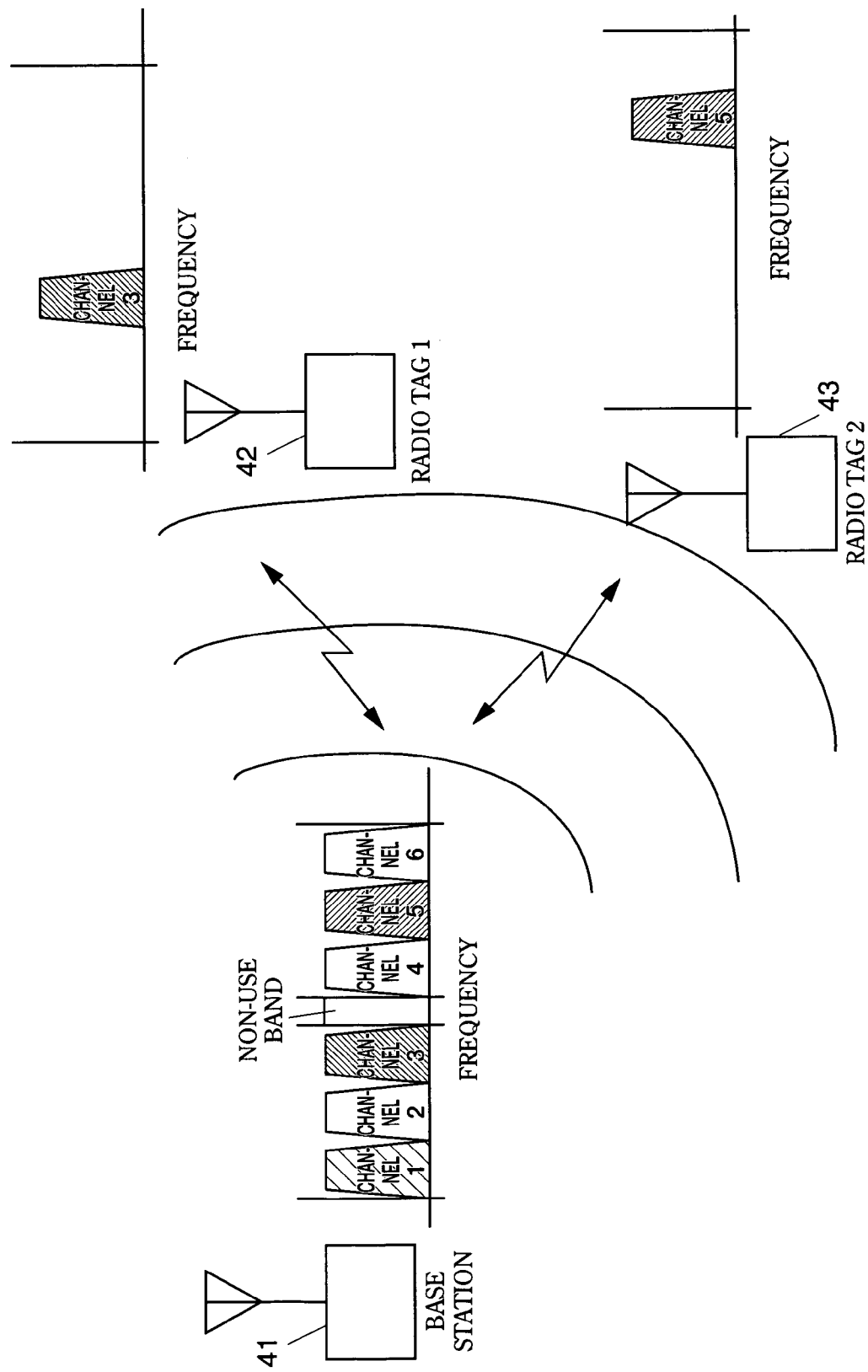
FIG. 31 is a concept figure showing a configuration of a reflective wireless tag system according to embodiment 4 of the invention.

FIG. 31 is a concept figure configuring and employing a reflective radio tag system as a wireless communication system using a pulse-modulated wireless communication apparatus according to embodiment 4 of the invention. The reflective radio tag system refers to a system for conveying the information mounted on a radio tag by absorbing to or reflecting upon a radio tag a signal sent from a base station (also called a leader station) to thereby modulate the radiation radio wave so that the signal can be demodulated to read data therefrom. By using the wireless communication apparatus of embodiment 1 or 2 as a base station 41, the signal at a synchronous-frequency channel only is sent from the base station 41 to the radio tag 42, 43. The modulation signal, reflected by the radio tag 42, 43 operable at a particular frequency channel, can be demodulated to read the information of the radio tag 42, 43.

Figure 32:
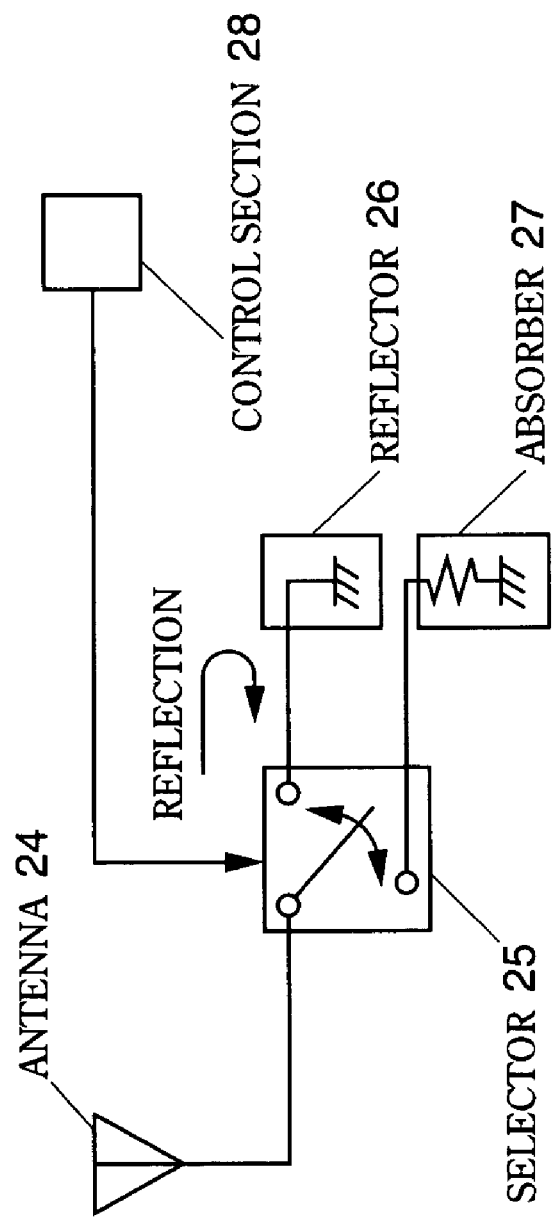
FIG. 32 is a block diagram of a reflective wireless tag of FIG. 31.

FIG. 32 is a simplified block diagram of a reflective radio tag. A selector 25 is controlled according to a control signal from a control section 28. The signal received at an antenna 24 can be reflected when connected with a reflector 26, and absorbed when connected with an absorber 27.

Figure 33:
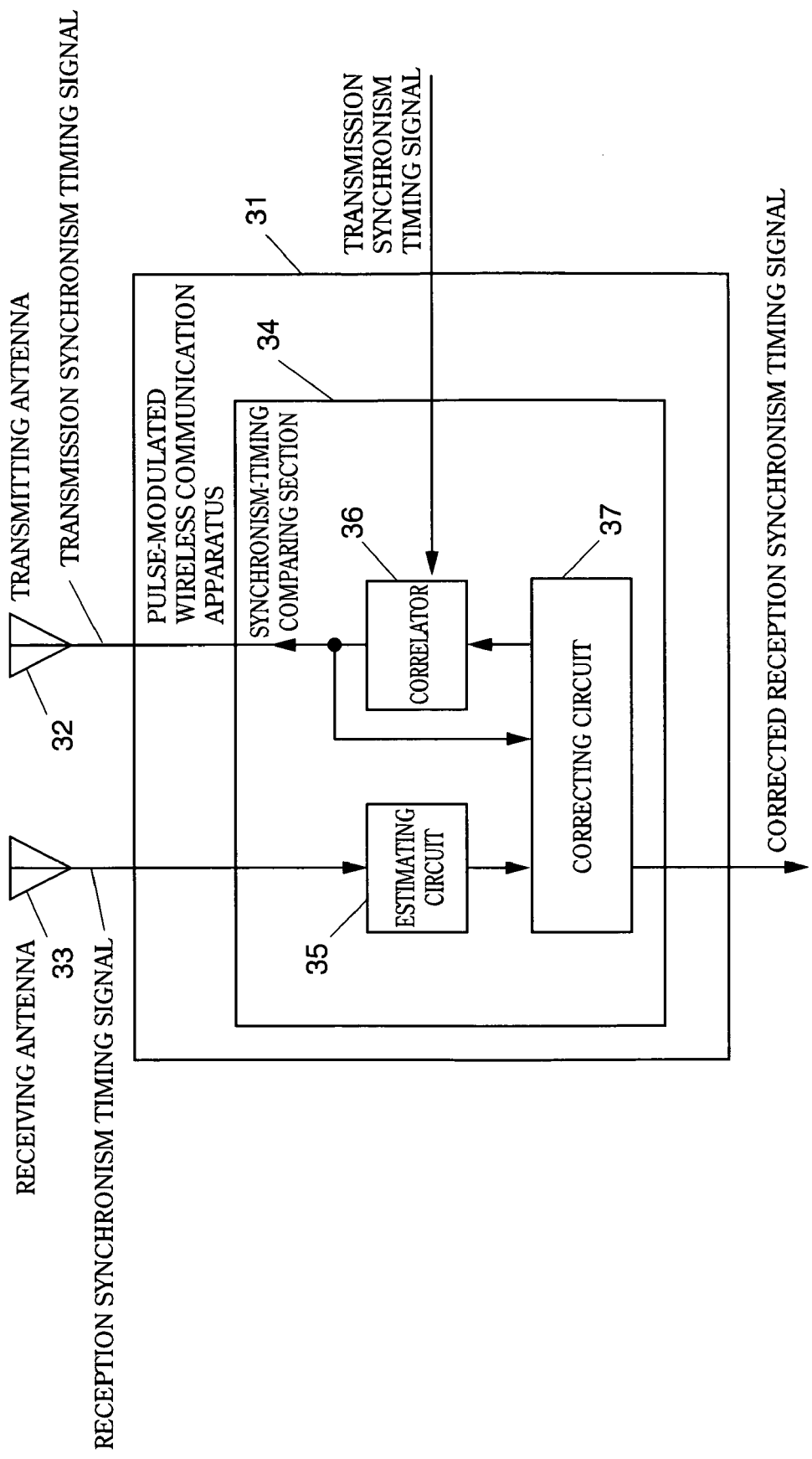
FIG. 33 is a block diagram of a base station apparatus of FIG. 31.

FIG. 33 is a block diagram of a base station apparatus. A synchronous timing comparing section 34 has an estimating circuit 35 for estimating a pre-pulse-modulated pulse signal width of a synchronous timing signal sent from the radio tag 42 and received at a receiving antenna 33, a correlator 36 for comparing a synchronism with a synchronous timing signal of the base station apparatus 31 itself using a pulse-modulated wireless communication apparatus, a correction circuit 37 for correcting the synchronization timing signal of the base station apparatus 31 itself by using an in-pulse timing offset time estimated in the estimating circuit 35 and a timing offset time estimated by the correlator 36 to thereby put it in synchronism with the received synchronization timing signal.

The procedure of reading and synchronization is briefly explained by using FIGS. 34A to 34F. The signal at a synchronous-frequency channel (FIG. 34A) sent from the base station 41 reaches the radio tag 42, 43, and obtains a synchronizing-channel signal (FIG. 34B) delayed by a reach time. The radio tag 42, 43 senses a reception of the synchronizing-channel signal (FIG. 34C), and begins to modulate a synchronizing signal the radio tag 42, 43 uniquely possesses (FIG. 34D), to reflect a modulation wave (FIG. 34E). On this occasion, at the radio tag 42, 43, synchronization is not made at the synchronous-frequency channel at all. The reflection wave, in a different waveform from that modulation shown in FIG. 34C is not made, is received by the base station 41 with a delay by a reach time. The synchronism timing signal at the base station 41 side is deviated in occurrence time such that the modulated reflection wave (FIG. 34F) becomes the same in waveform as the reflection wave not modulated (FIG. 34C). This can establish a synchronism with the synchronism timing signal of the radio tag.

Incidentally, in the reflective tag system using the usual continuous wave, there is a difficulty in separating a signal of from the radio tag of within the same system. However, in the radio tag system in this embodiment using pulse modulation, the reflection wave (reception modulated wave) is demodulated depending upon a correlation with the pulse-formed synchronizing signal sent from the base station. Therefore, there is low correlation with the other channel signals and multi-path, thus eliminating the necessity of interference removal by a complicated signal processing circuit.

The above arrangement realizes a wireless tag system small in apparatus size and cheap in price but high in data transmission.

Incidentally, the above explanation described only on the synchronization between the base station apparatus and the radio tag. However, data transmission may be by modulating and reflecting a synchronizing signal by means of the radio tag.

Meanwhile, in the case of merely reading out data, the communications based on the reflective radio wave may be only for the case the communication data is small in amount, thereby carrying out communications reduced in consumption power.

Meanwhile, although the above explained the example of the wireless system using a radio tag, the communications based on the reflective radio wave is applicable not only to the wireless tag system but also to the other wireless system described in embodiment 1 to 3.

Meanwhile, the synchronizing signal and information signal may be used in power transmission wherein it is detected and rectified in the receiver apparatus thereby being utilized as a power source for the receiver apparatus.

Meanwhile, the power transmission signal may use a frequency band for narrow-band communications, e.g. 2.4 GHz ISM band.

What is claimed is:

1. A pulse-modulated wireless communication apparatus, characterized by comprising:
    an inputting section for inputting a transmission information signal; and
    a channel setting section for receiving said transmission information signal, generating a synchronizing signal and a data signal by using the transmission information signal, setting and outputting the synchronizing signal to a first frequency channel comprising at least one of frequency channels configured by segmenting a communication frequency band into at least two, and setting and outputting the data signal to a second frequency channel comprising at least one of the frequency channels, wherein the first frequency channel and the second frequency channel use different ones of the frequency channels from each other,
    wherein the channel setting section comprises an encoder for generating a synchronizing-channel signal and a data-channel signal by using the transmission information signal, a synchronizing-channel signal generating section for band-limiting, after frequency conversion, the synchronizing-channel signal, setting the signal at the first frequency channel and outputting a synchronizing signal, and a data-signal generating section for band-limiting, after frequency conversion, the data-channel signal, setting the signal at the second frequency channel and outputting a data signal.

2. A pulse-modulated wireless communication apparatus according to claim 1, wherein the synchronizing signal uses a system clock of an in-apparatus CPU mounting a pulse-modulated wireless communication apparatus.

3. A pulse-modulated wireless communication apparatus according to claim 1, wherein the encoder always outputs a synchronizing signal.

4. A pulse-modulated wireless communication apparatus according to claim 1, wherein the synchronizing-channel signal generating section comprises a first pulse modulator for generating a first pulse string signal, a first variable frequency oscillator for outputting a first local oscillation signal, a first mixer for frequency-converting the first pulse string signal by using the first local oscillation signal and a first band-pass filter for band-limiting a frequency-converted signal, setting the signal at the first frequency channel and outputting a synchronizing signal, wherein the data-channel signal generating section comprises a second pulse modulator for generating a second pulse string signal, a second variable frequency oscillator for outputting a second local oscillation signal, a second mixer for frequency-converting the second pulse string signal by using the second first local oscillation signal and a second band-pass filter for band-limiting a frequency-converted signal, setting the signal at the second frequency channel and outputting a data signal.

5. A pulse-modulated wireless communication apparatus according to claim 4, further comprising a timing generator for putting the first pulse string signal and the second pulse string signal in synchronism with each other.

6. A pulse-modulated wireless communication apparatus according to claim 4, wherein the first band-pass filter is variable in pass band.

7. A pulse-modulated wireless communication apparatus according to claim 1, wherein a plurality of frequency channels at which the synchronizing signal is to set are set within the first frequency channel, the channel setting section is allowed to vary the synchronous-frequency channel to which the synchronizing signal is to be set.

8. A pulse-modulated wireless communication apparatus according to claim 7, wherein the synchronous-frequency channel is set at a regular time interval.

9. A pulse-modulated wireless communication apparatus according to claim 8, further comprising a synchronizing-channel control section for outputting a synchronous-frequency channel control signal to control the synchronous-frequency channel, the synchronous-frequency channel is set according to the synchronous-frequency channel control signal.

10. A pulse-modulated wireless communication apparatus according to claim 1, wherein the channel setting section, within a given time, sets a synchronous-frequency channel at a plurality of frequency channels and a data-frequency channel, at which a data signal is to be set, to one or less of the frequency channels.

11. A pulse-modulated wireless communication apparatus according to claim 9, wherein the synchronizing-channel control section, within a predetermined time, outputs a synchronous-frequency channel control signal such that a number of times the synchronizing signal uses the frequency channel is greater than a number of times the data signal uses the frequency channel.

12. A pulse-modulated wireless communication apparatus according to claim 4, wherein the second band-pass filter is variable in pass band.

13. A pulse-modulated wireless communication apparatus according to claim 1, wherein a plurality of frequency channels at which a data signal is to be set are set within the second frequency channel, and the channel setting section is allowed to vary the data-frequency channel at which the data signal is to be set.

14. A pulse-modulated wireless communication apparatus according to claim 13, wherein the data-frequency channel is set at a regular time interval.

15. A pulse-modulated wireless communication apparatus according to claim 14, further comprising a data-channel control section for outputting a data-frequency channel control signal to control the data-frequency channel, the data-frequency channel being set according to the data-frequency channel control signal.

16. A pulse-modulated wireless communication apparatus according to claim 15, wherein the channel setting section, within a given time, sets a data frequency channel to one or less of the frequency channel and set a plurality of synchronous-frequency channels at which the synchronizing signal is to be set.

17. A pulse-modulated wireless communication apparatus according to claim 1 including,
a synchronizing-channel control section for generating a synchronous-frequency channel control signal; and
a data-channel control section for generating a data-frequency channel control signal;
wherein the channel setting section generates the synchronizing signal and the data signal from the inputted transmission information signal depending upon the synchronous-frequency channel control signal and the data-frequency channel control signal, and
a reception modulating section for inputting and demodulating the synchronous channel signal received at a first receiving antenna and the data channel signal received at a second receiving antenna depending upon the synchronous-frequency channel control signal and the data-frequency channel control signal.

18. A pulse-modulated wireless communication apparatus according to claim 17, wherein the synchronous-frequency channel at which a synchronizing signal is to be set is set to include a frequency channel lowest in frequency of all the frequency channels.

19. A pulse-modulated wireless communication apparatus according to claim 1, wherein the synchronizing signal uses a pulse string signal for pulse-modulating the data signal.

20. A pulse-modulated wireless communication apparatus according to claim 1, wherein the synchronizing signal uses a sinusoidal wave.

21. A pulse-modulated wireless communication apparatus according to claim 1, wherein the synchronizing signal uses, a pulse string signal for pulse-modulating the data signal and a sinusoidal wave by switching over.

22. A pulse-modulated wireless communication apparatus according to claim 21, wherein communication distance is used as a criterion of switchover when the synchronizing signal uses a pulse string signal for pulse-modulating the data signal and a sinusoidal wave by switching over.

23. A pulse-modulated wireless communication apparatus according to claim 22, wherein the synchronizing signal uses a pulse string signal when communication distance is short, and a sinusoidal wave when communication distance is long.

24. A pulse-modulated wireless communication apparatus according to claim 21, wherein a reception data error rate is used as a criterion of switchover when the synchronizing signal uses a pulse string signal for pulse-modulating the data signal and a sinusoidal wave by switching over.

25. A pulse-modulated wireless communication apparatus according to claim 24, wherein the synchronizing signal uses a pulse string signal when the error rate is low, and a sinusoidal wave when error rate is high.

26. A pulse-modulated wireless communication apparatus according to claim 17, wherein the data-channel control section, within a predetermined time, outputs a data-frequency channel control signal such that a number of times the data signal uses the frequency channel is less than a number of times the synchronizing signal uses the frequency channel.

27. A pulse-modulated wireless communication apparatus according to claim 1, wherein the synchronizing signal and data signal has an output power to be desirably changed depending upon a state of communication.

28. A pulse-modulated wireless communication apparatus according to claim 27, wherein the synchronizing signal and data signal has an output power to be changed depending upon a distance of communication.

29. A pulse-modulated wireless communication apparatus according to claim 27, wherein the synchronizing signal and data signal has an output power to be changed depending upon a reception data error rate.

30. A pulse-modulated wireless communication apparatus according to claim 4, wherein the first and second pulse modulators use a scheme of pulse position modulation.

31. A pulse-modulated wireless communication apparatus according to claim 4, wherein the first and second pulse modulators use a scheme of bi-phase modulation.

32. A pulse-modulated wireless communication apparatus comprising:
   a synchronizing-channel control section for generating a synchronous-frequency channel control signal;
   a data-channel control section for generating a data-frequency channel control signal;
   a channel setting section for generating a synchronizing signal and data signal from an inputted transmission information signal depending upon the synchronous-frequency channel control signal and data-frequency channel control signal;
   a first transmitting antenna for setting and sending the synchronizing signal to one of a plurality of frequency channels previously set by segmenting a communication frequency band;
   a second transmitting antenna for setting and sending the data signal to another of the plurality of frequency channels;
   a first receiving antenna for receiving a synchronous channel signal;
   a second receiving antenna for receiving a data channel signal; and
   a reception modulating section for inputting the synchronous channel signal received at the first receiving antenna and the data channel signal received at the second receiving antenna, and demodulating them depending upon the synchronous-frequency channel control signal and data-frequency channel control signal.

33. A pulse-modulated wireless communication apparatus according to claim 32, wherein the reception demodulator comprises a synchronism-timing generating section for inputting a reception signal and generating a synchronism timing signal, a data-channel signal receiving section for demodulating the reception signal by using the synchronism timing signal and generating a reception demodulated signal, and a decoder for generating a reception data signal by using the reception demodulated signal.

34. A pulse-modulated wireless communication apparatus according to claim 33, wherein the synchronism-timing generating section always outputs a synchronism timing signal.

35. A pulse-modulated wireless communication apparatus according to claim 33, wherein the synchronizing-channel extracting section comprises a first band-pass filter for band-limiting the reception signal and extracting only a signal at the synchronous-frequency channel, a first variable frequency oscillator for outputting a first local oscillation signal, a first mixer for frequency-converting the extracted signal at the extracted synchronous frequency channel by using the first local oscillation signal, and a first pulse demodulator for demodulating the synchronizing-channel reception signal generated by the first mixer, wherein the data-channel signal receiving section comprises a second band-pass filter for band-limiting the reception signal and extracting only a signal at the data-frequency channel, a second variable frequency oscillator for outputting a second local oscillation signal, a second mixer for frequency-converting the extracted signal at the extracted data frequency channel by using the second local oscillation signal, and a second pulse demodulator for demodulating the data-channel reception signal generated by the second mixer.

36. A pulse-modulated wireless communication apparatus according to claim 35, wherein the first band-pass filter is variable in pass band.

37. A pulse-modulated wireless communication apparatus according to claim 35, wherein the second band-pass filter is variable in pass band.

38. A pulse-modulated wireless communication apparatus according to claim 35, wherein the first band-pass filter is fixed in pass band, and the synchronous-timing generating section receives only a signal at the synchronous-timing frequency channel having a particular frequency and generates a synchronous timing signal.

39. A pulse-modulated wireless communication apparatus according to claim 33, wherein the synchronism-timing generating section comprises a synchronous channel extracting section for inputting a reception signal and extracting only a synchronizing-channel extraction signal of within the synchronous-frequency channel, and a timing generating section for generating a synchronism timing signal by using the synchronizing-channel extraction signal.

40. A pulse-modulated wireless communication apparatus according to claim 33, wherein the data-channel signal receiving section inputs therein a reception signal and extracts only a data signal of within the data-frequency channel, and pulse-demodulates the data signal by using a synchronism timing signal generated by the synchronism-timing generating section thereby outputting a reception demodulated signal.

41. A wireless communication system making use of a plurality of pulse-modulated wireless communication apparatuses, characterized in that:
   an inputting section for inputting a signal at a synchronous-frequency channel; and
   a first pulse-modulated wireless communication apparatus generates a synchronism timing signal by using said signal at said synchronous-frequency channel of a second pulse-modulated wireless communication apparatus,
   wherein the first pulse-modulated wireless communication apparatus includes a synchronism-timing comparing section for adjusting a synchronism timing depending upon a synchronizing signal generated by receiving a signal at a synchronous-frequency channel sent from the second pulse-modulated wireless communication apparatus, and
   wherein the synchronism-timing comparing section comprises an estimating circuit for estimating a pulse signal width of before pulse demodulation of a synchronism timing signal received from the second pulse-modulated wireless communication apparatus, a correlator for comparing a synchronism of a synchronism timing signal with that of the first pulse-modulated wireless communication apparatus itself, a correcting section for correcting the synchronism timing signal of the first pulse-modulated wireless communication apparatus itself by using an in-pulse timing offset time estimated in the estimating circuit and a timing offset signal estimated by the correlator into synchronism with the received synchronism timing signal.

42. A wireless communication system according to claim 41, wherein the second pulse-modulated wireless communication apparatus sends a signal at the synchronous frequency channel by reflecting a signal at the synchronous frequency channel sent from the first pulse-modulated wireless communication apparatus.

43. A wireless communication system according to claim 41, wherein the second pulse-modulated wireless communication apparatus sends data which the second pulse-modulated wireless communication apparatus has by reflecting a signal at the synchronous frequency channel sent from the first pulse-modulated wireless communication apparatus.

* * * * *